(12) United States Patent
Aho et al.

(10) Patent No.: US 7,984,267 B2
(45) Date of Patent: Jul. 19, 2011

(54) MESSAGE PASSING MODULE IN HYBRID COMPUTING SYSTEM STARTING AND SENDING OPERATION INFORMATION TO SERVICE PROGRAM FOR ACCELERATOR TO EXECUTE APPLICATION PROGRAM

(75) Inventors: Michael E. Aho, Rochester, MN (US); Ricardo M. Matinata, Campinas (BR); Amir F. Sanjar, Austin, TX (US); Gordon G. Stewart, Rochester, MN (US); Cornell G. Wright, Jr., Los Alamos, NM (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 12/204,352

(22) Filed: Sep. 4, 2008

(65) Prior Publication Data
US 2010/0058031 A1 Mar. 4, 2010

(51) Int. Cl.
*G06F 15/16* (2006.01)
(52) U.S. Cl. .......................................... 712/29; 712/31
(58) Field of Classification Search .................. None
See application file for complete search history.

(56) References Cited

U.S. PATENT DOCUMENTS

| | | | |
|---|---|---|---|
| 4,989,131 A | 1/1991 | Stone | |
| 5,363,484 A | 11/1994 | Desnoyers et al. | |
| 5,467,459 A | 11/1995 | Alexander et al. | |
| 5,590,345 A | 12/1996 | Barker et al. | |
| 5,613,146 A | 3/1997 | Gove et al. | |
| 6,266,745 B1 | 7/2001 | De Backer et al. | |
| 6,377,979 B1 | 4/2002 | Yamashita et al. | |
| 6,473,849 B1 | 10/2002 | Keller et al. | |
| 6,598,130 B2 | 7/2003 | Harris et al. | |
| 7,383,330 B2 | 6/2008 | Moran et al. | |
| 7,418,574 B2 | 8/2008 | Mathur et al. | |
| 7,469,273 B2 | 12/2008 | Anderson et al. | |
| 7,631,023 B1 | 12/2009 | Kaiser et al. | |
| 7,668,924 B1 | 2/2010 | Young et al. | |
| 7,814,295 B2 | 10/2010 | Inglett et al. | |
| 2002/0056033 A1 | 5/2002 | Huppenthal | |
| 2002/0108059 A1 | 8/2002 | Canion et al. | |
| 2003/0061432 A1 | 3/2003 | Huppenthal et al. | |
| 2003/0226018 A1* | 12/2003 | Tardo et al. ................... | 713/168 |

(Continued)

OTHER PUBLICATIONS

Buonadonna, Phillip, Culler, David, "Queue Pair IP: A Hybrid Architecture For System Area Networks", Aug. 7, 2002. Computer Architecture. 2002. Proceedings. 29th Annual Symposium. pp. 247-256.

(Continued)

*Primary Examiner* — Kenneth S Kim
(74) *Attorney, Agent, or Firm* — Biggers & Ohanian, LLP

(57) ABSTRACT

Executing a service program for an accelerator application program in a hybrid computing environment that includes a host computer and an accelerator, the host computer and the accelerator adapted to one another for data communications by a system level message passing module; where the service program includes a host portion and an accelerator portion and executing a service program for an accelerator includes receiving, from the host portion, operating information for the accelerator portion; starting the accelerator portion on the accelerator; providing, to the accelerator portion, operating information for the accelerator application program; establishing direct data communications between the host portion and the accelerator portion; and, responsive to an instruction communicated directly from the host portion, executing the accelerator application program.

18 Claims, 9 Drawing Sheets

U.S. PATENT DOCUMENTS

| | | | |
|---|---|---|---|
| 2006/0018341 | A1 | 1/2006 | Pettery et al. |
| 2006/0168435 | A1* | 7/2006 | Svensson et al. ............... 713/1 |
| 2007/0255802 | A1 | 11/2007 | Aloni et al. |
| 2008/0028103 | A1 | 1/2008 | Schlansker et al. |
| 2008/0091855 | A1 | 4/2008 | Moertl et al. |
| 2008/0183882 | A1 | 7/2008 | Flynn et al. |
| 2008/0256330 | A1* | 10/2008 | Wang et al. ............... 712/24 |
| 2008/0259086 | A1 | 10/2008 | Doi et al. |
| 2009/0024734 | A1 | 1/2009 | Merbach et al. |
| 2009/0080428 | A1 | 3/2009 | Witkowski et al. |
| 2009/0110326 | A1 | 4/2009 | Kim et al. |
| 2010/0036940 | A1 | 2/2010 | Carey et al. |
| 2010/0058031 | A1 | 3/2010 | Aho et al. |
| 2010/0058356 | A1 | 3/2010 | Aho et al. |
| 2010/0064295 | A1 | 3/2010 | Aho et al. |
| 2010/0153541 | A1 | 6/2010 | Arimilli et al. |
| 2010/0191711 | A1 | 7/2010 | Carey et al. |
| 2010/0191822 | A1 | 7/2010 | Archer et al. |
| 2010/0191823 | A1 | 7/2010 | Archer et al. |
| 2010/0191909 | A1 | 7/2010 | Archer et al. |
| 2010/0191917 | A1 | 7/2010 | Archer et al. |
| 2010/0191923 | A1 | 7/2010 | Archer et al. |
| 2010/0192123 | A1 | 7/2010 | Carey et al. |
| 2010/0198997 | A1 | 8/2010 | Archer et al. |
| 2010/0274868 | A1 | 10/2010 | Arroyo et al. |
| 2011/0035556 | A1 | 2/2011 | Aho et al. |

OTHER PUBLICATIONS

Brightwell, Rin, Doerfler, Doug, Underwood D., Keith, "A Preliminary Analysis of the Infiniband and XD1 Network Interfaces", Jun. 26, 2006, Parallel and Distribution Processing Symposium, 2006. IPDPS 2006. 20th International, p. 8.
Office Action, U.S. Appl. No. 12/189,342, Aug. 11, 2008.
Office Action, U.S. Appl. No. 12/428,646, Feb. 7, 2007.
U.S. Appl. No. 12/771,627, Apr. 2010.
Rexford, Jennifer, Bonomi Flavio; Greenberg Albert, Wong Albert, "Scalable Architectures for Integrated Traffic Shaping and Link Scheduling in High-Speed ATM Switches", Jun. 5, 1997, IEEE Journal on Selected Areas in Communications, vol. 15 No. 5, pp. 938-950.
Office Action, U.S. Appl. No. 12/204,352, Dec. 16, 2010.
Final Office Action, U.S. Appl. No. 12/189,342, Dec. 23, 2010.
Office Action, U.S. Appl. No. 12/362,137, Nov. 22, 2010.
Office Action, U.S. Appl. No. 12/364,590, Nov. 11, 2010.
Office Action, U.S. Appl. No. 12/361,910, Nov. 19, 2010.

* cited by examiner

MESSAGE PASSING MODULE IN HYBRID COMPUTING SYSTEM STARTING AND SENDING OPERATION INFORMATION TO SERVICE PROGRAM FOR ACCELERATOR TO EXECUTE APPLICATION PROGRAM

BACKGROUND OF THE INVENTION

1. Field of the Invention

The field of the invention is data processing, or, more specifically, methods, apparatus, and products for executing a service program for an accelerator application program in a hybrid computing environment.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output ('I/O') devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today have advanced such that some computing environments now include core components of different architectures which operate together to complete data processing tasks. Such computing environments are described in this specification as 'hybrid' environments, denoting that such environments include host computers and accelerators having different architectures. Although hybrid computing environments are more computationally powerful and efficient in data processing than many non-hybrid computing environments, such hybrid computing environments still present substantial challenges to the science of automated computing machinery.

SUMMARY OF THE INVENTION

Methods, apparatus, and products for executing a service program for an accelerator application program in a hybrid computing environment, the hybrid computing environment including a host computer having a host computer architecture; an accelerator having an accelerator architecture, the accelerator architecture optimized, with respect to the host computer architecture, for speed of execution of a particular class of computing functions; where the host computer and the accelerator are adapted to one another for data communications by a system level message passing module. The service program is a module of computer program instructions capable of controlling or monitoring, at the level of individual computer program instructions, execution of an accelerator application program where the service program includes a host portion configured to execute on the host computer architecture and an accelerator portion configured to execute on the accelerator architecture.

Executing a service program for an accelerator application program in a hybrid computing environment according to embodiments of the present invention includes receiving, by the system level message passing module from the host portion of the service program, operating information for the accelerator portion of the service program; starting, by the system level message passing module, the accelerator portion of the service program on the accelerator; providing, by the system level message passing module to the accelerator portion of the service program, operating information for the accelerator application program, the operating information for the accelerator application program comprising environment variables and execution parameters; establishing, by the system level message passing module, direct data communications between the host portion of the service program and the accelerator portion of the service program; and, responsive to an instruction communicated directly from the host portion of the service program, executing the accelerator application program by the accelerator portion of the service program.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
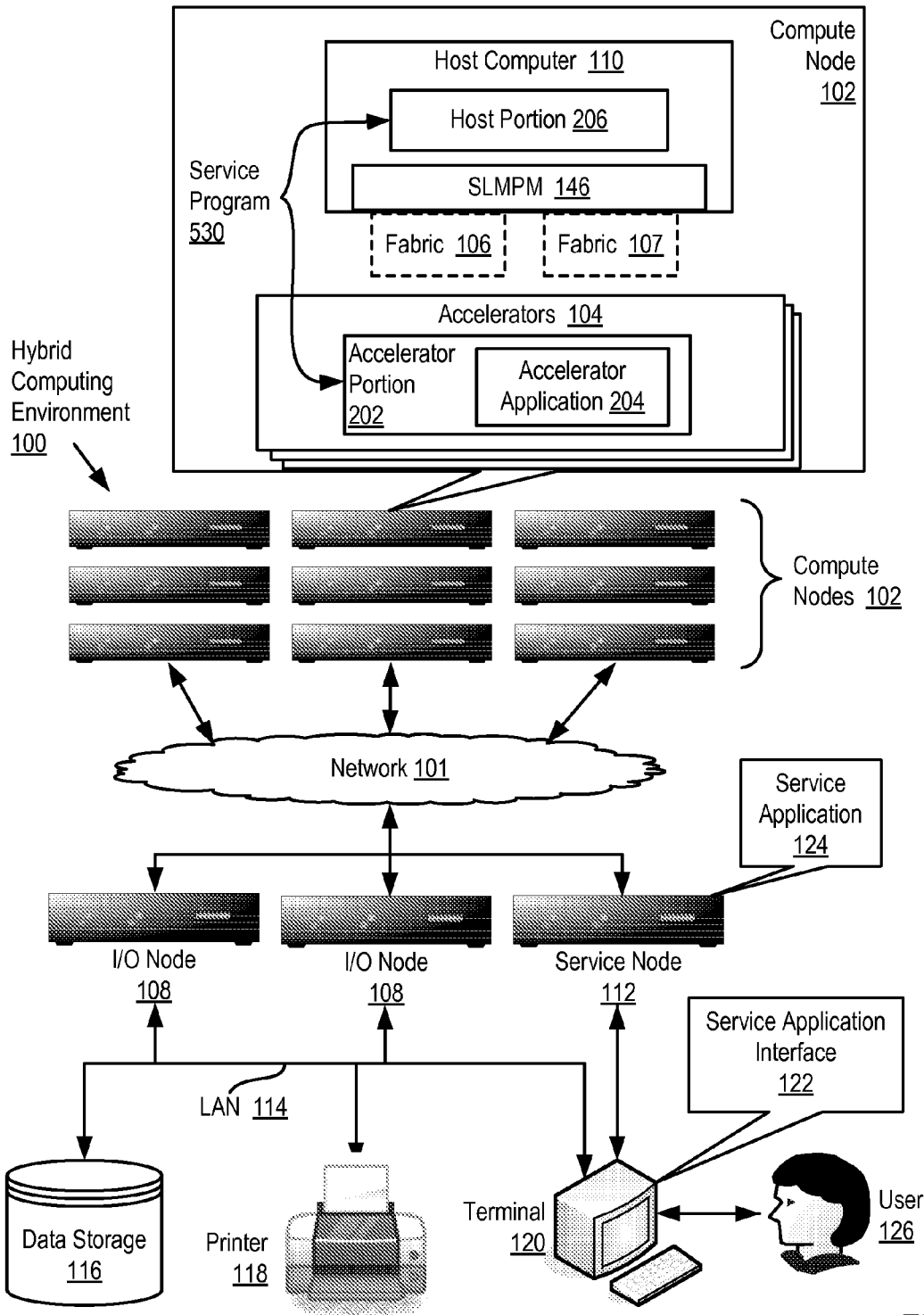
FIG. 1 sets forth a diagram of an example hybrid computing environment useful for executing a service program for an accelerator application program according to embodiments of the present invention.

Exemplary methods, apparatus, and products for executing a service program for an accelerator application program in a hybrid computing environment according to embodiments of the present invention are described with reference to the accompanying drawings, beginning with FIG. 1. FIG. 1 sets forth a diagram of an example hybrid computing environment (100) useful for executing a service program for an accelerator application program according to embodiments of the present invention. A 'hybrid computing environment,' as the term is used in this specification, is a computing environment in that it includes computer processors operatively coupled to computer memory so as to implement data processing in the form of execution of computer program instructions stored in the memory and executed on the processors. In addition, the hybrid computing environment (100) in the example of FIG. 1 includes at least one host computer having a host architecture that operates in cooperation with an accelerator having an accelerator architecture where the host architecture and accelerator architecture are different architectures. The host and accelerator architectures in this example are characterized by architectural registers, registers that are accessible by computer program instructions that execute on each architecture, registers such as, for example, an instruction register, a program counter, memory index registers, stack pointers, and the like. That is, the number, type, structure, and relations among the architectural registers of the two architectures are different, so different that computer program instructions compiled for execution on the host computer of a hybrid computing environment typically cannot be executed natively by any associated accelerator of the hybrid computing environment.

Examples of hybrid computing environments include a data processing system that in turn includes one or more host computers, each having an x86 processor, and accelerators whose architectural registers implement the PowerPC instruction set. Computer program instructions compiled for execution on the x86 processors in the host computers cannot be executed natively by the PowerPC processors in the accelerators. Readers will recognize in addition that some of the example hybrid computing environments described in this specification are based upon the Los Alamos National Laboratory ('LANL') supercomputer architecture developed in the LANL Roadrunner project (named for the state bird of New Mexico), the supercomputer architecture that famously first generated a 'petaflop,' a million billion floating point operations per second. The LANL supercomputer architecture includes many host computers with dual-core AMD Opteron processors coupled to many accelerators with IBM Cell processors, the Opteron processors and the Cell processors having different architectures.

The example hybrid computing environment (100) of FIG. 1 includes a plurality of compute nodes (102), I/O nodes (108), and a service node (112). The compute nodes (102) are coupled through network (101) for data communications with one another and with the I/O nodes (108) and the service node (112). The data communications network (101) may be implemented as an Ethernet, Internet Protocol ('IP'), PCIe, Infiniband, Fibre Channel, or other network as will occur to readers of skill in the art.

In the example hybrid computing environment (100) of FIG. 1, the compute nodes carry out principal user-level computer program execution, accepting administrative services, such as initial program loads and the like, from the service application (124) executing on the service node (112) and gaining access to data storage (116) and I/O functionality (118, 120) through the I/O nodes (108). In the example of FIG. 1, the I/O nodes (108) are connected for data communications to I/O devices (116, 118, 120) through a local area network ('LAN') (114) implemented using high-speed Ethernet or a data communications fabric of another fabric type as will occur to those of skill in the art. I/O devices in the example hybrid computing environment (100) of FIG. 1 include non-volatile memory for the computing environment in the form of data storage device (116), an output device for the hybrid computing environment in the form of printer (118), and a user (126) I/O device in the form of computer terminal (120) that executes a service application interface (122) that provides to a user an interface for configuring compute nodes in the hybrid computing environment and initiating execution by the compute nodes of principal user-level computer program instructions.

In the example of FIG. 1, each compute node includes a host computer (110) having a host computer architecture and one or more accelerators (104) having an accelerator architecture. A host computer (110) is a 'host' in the sense that it is the host computer that carries out interface functions between a compute node and other components of the hybrid computing environment external to any particular compute node. That is, it is the host computer that executes initial boot procedures, power on self tests, basic I/O functions, accepts user-level program loads from service nodes, and so on. An accelerator (104) is an 'accelerator' in that each accelerator has an accelerator architecture that is optimized, with respect to the host computer architecture, for speed of execution of a particular class of computing functions. Such accelerated computing functions include, for example, vector processing, floating point operations, and others as will occur to those of skill in the art.

Because each of the compute nodes in the example of FIG. 1 includes a host computer and an accelerator, readers of skill in the art will recognize that each compute node represents a smaller, separate hybrid computing environment within the larger hybrid computing environment (100) of FIG. 1. That is, not only may the combination of the compute nodes (102) form a hybrid computing environment (100), but it is also the case that each individual compute node may also be viewed as a separate, smaller hybrid computing environment. The hybrid computing environment (100) in the example of FIG. 1 then, may be viewed as composed of nine separate, smaller hybrid computing environments, one for each compute node, which taken together form the hybrid computing environment (100) of FIG. 1.

Within each compute node (102) of FIG. 1, a host computer (110) and one or more accelerators (104) are adapted to one another for data communications by a system level message passing module ('SLMPM') (146) and by two or more data communications fabrics (106, 107) of at least two different fabric types. An SLMPM (146) is a module or library of computer program instructions that exposes an application programming interface ('API') to user-level applications for carrying out message-based data communications between the host computer (110) and the accelerator (104). Examples of message-based data communications libraries that may be improved for use as an SLMPM according to embodiments of the present invention include:

the Message Passing Interface or 'MPI,' an industry standard interface in two versions, first presented at Supercomputing 1994, not sanctioned by any major standards body, the Data Communication and Synchronization interface ('DACS') of the LANL supercomputer, the POSIX Threads library ('Pthreads'), an IEEE standard for distributed, multithreaded processing, the Open Multi-Processing interface ('OpenMP'), an industry-sanctioned specification for parallel programming, and other libraries that will occur to those of skill in the art.

A data communications fabric (106, 107) is a configuration of data communications hardware and software that implements a data communications coupling between a host computer and an accelerator. Examples of data communications fabric types include Peripheral Component Interconnect ('PCI'), PCI express ('PCIe'), Ethernet, Infiniband, Fibre Channel, Small Computer System Interface ('SCSI'), External Serial Advanced Technology Attachment ('eSATA'), Universal Serial Bus ('USB'), and so on as will occur to those of skill in the art.

The SLMPM (146) and an accelerator portion of a service program (530) may operate generally for executing a service program (530) for an accelerator application program in the hybrid computing environment (100) of FIG. 1 according to embodiments of the present invention. A 'service program' as the term is used in the specification is a module of computer program instructions capable of controlling or monitoring, at the level of individual computer program instructions, execution of an accelerator application program (204). Some service programs executed in hybrid computing environments according to embodiments of the present invention may carry out such control or monitoring of an accelerator application program typically for purposes of software application development or tuning. The service program (530) may carry out such control or monitoring by interposing a number of interrupts within the application code so as to provide the service program opportunities to make decisions and record information regarding the application's operations. With such interrupts in the application's code, running the service program with the application typically slows execution of the application such that running the service program with the application in normal production is undesirable. Examples of such service programs include debuggers, profilers, tracers, and the like. The service program (530) executed in the example hybrid computing environment (100) of FIG. 1 may include a host portion (206) configured to execute on the host computer architecture and an accelerator portion (202) configured to execute on the accelerator architecture.

The SLMPM (146) in the example of FIG. 1 may receive, from the host portion (206) of the service program (530), operating information for the accelerator portion (202) of the service program; start the accelerator portion (202) of the service program (530) on an accelerator (104); provide, to the accelerator portion (202) of the service program (530), operating information for the accelerator application program (204); and establish direct data communications between the host portion (206) of the service program (530) and the accelerator portion (202) of the service program. Upon establishing direct data communications between the host portion (206) and accelerator portion (202) and responsive to an instruction communicated directly from the host portion (206), the accelerator portion (202) of the service program may execute the accelerator application program (204).

The arrangement of compute nodes, data communications fabrics, networks, I/O devices, service nodes, I/O nodes, and so on, making up the hybrid computing environment (100) as illustrated in FIG. 1 are for explanation only, not for limitation of the present invention. Hybrid computing environments useful for executing a service program for an accelerator application program according to embodiments of the present invention may include additional nodes, networks, devices, and architectures, not shown in FIG. 1, as will occur to those of skill in the art. Although the hybrid computing environment (100) in the example of FIG. 1 includes only nine compute nodes (102), readers will note that hybrid computing environments according to embodiments of the present invention may include any number of compute nodes. The LANL supercomputer, taken as an example of a hybrid computing environment with multiple compute nodes, contains as of this writing more than 12,000 compute nodes. Networks and data communications fabrics in such hybrid computing environments may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Figure 2:
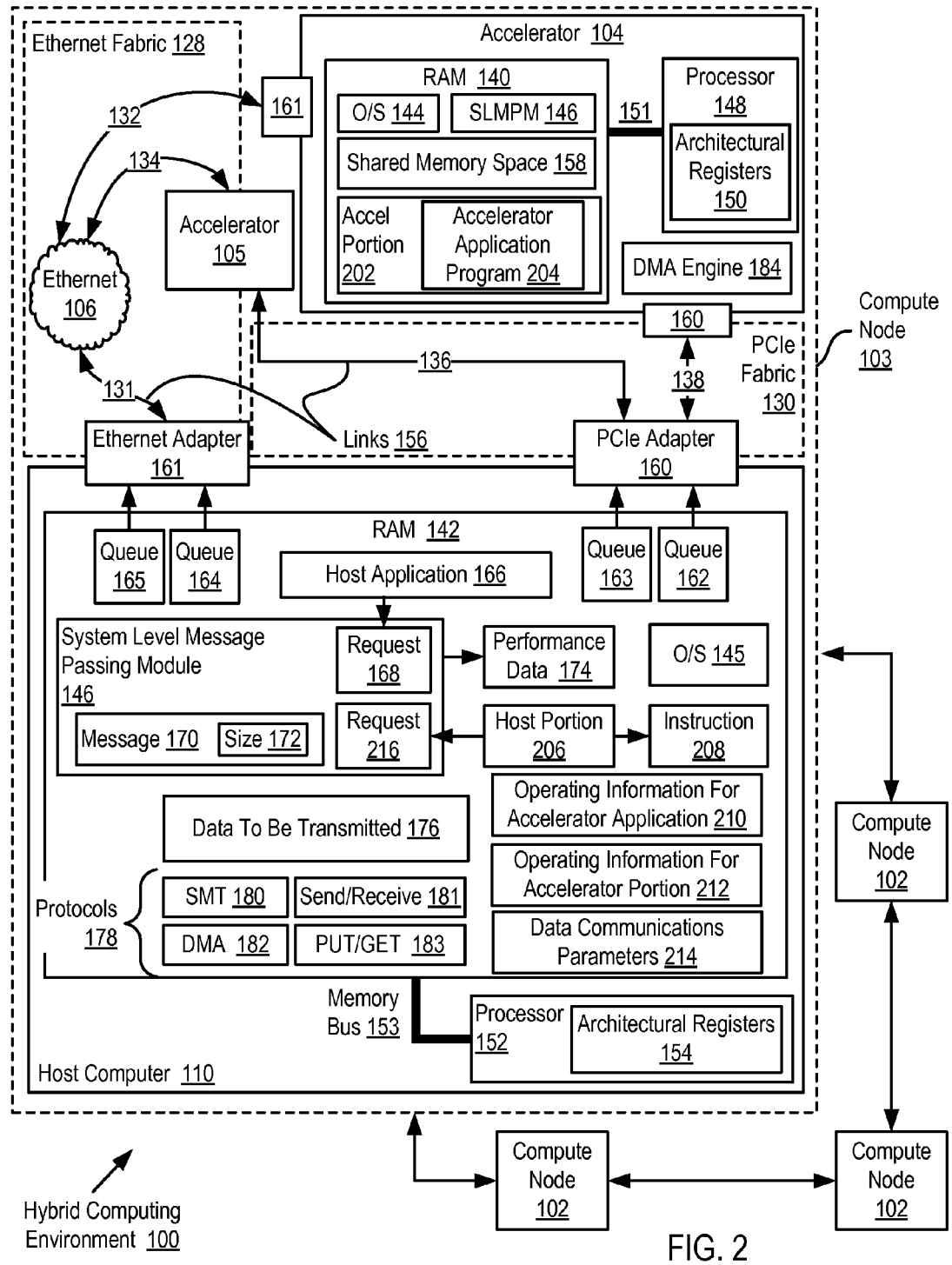
FIG. 2 sets forth a block diagram of an exemplary hybrid computing environment useful for executing a service program for an accelerator application program according to embodiments of the present invention.

For further explanation, FIG. 2 sets forth a block diagram of an exemplary hybrid computing environment (100) useful for executing a service program for an accelerator application program according to embodiments of the present invention. The hybrid computing environment (100) of FIG. 2 includes four compute nodes. Similar to the compute nodes of FIG. 1, each of the compute nodes in the example of FIG. 2 may represent a small, separate hybrid computing environment which taken together make up a larger hybrid computing environment. One compute node (103) in the example of FIG. 2 is illustrated in an expanded view to aid a more detailed explanation of such a hybrid computing environment (100). As shown in the expanded view of compute node (103), each of the compute nodes (102, 103) in the example of FIG. 2 includes a host computer (110). The host computer (110) includes a computer processor (152) operatively coupled to computer memory, Random Access Memory ('RAM') (142), through a high speed memory bus (153). The processor (152) in each host computer (110) has a set of architectural registers (154) that defines the host computer architecture.

Each of the compute nodes also includes one or more accelerators (104, 105). Each accelerator (104, 105) includes a computer processor (148) operatively coupled to RAM (140) through a high speed memory bus (151). Stored in RAM (140, 142) of the host computer and the accelerators (104, 105) is an operating system (145). Operating systems useful in host computers and accelerators of hybrid computing environments according to embodiments of the present invention include UNIX™, Linux™, Microsoft XP™, Microsoft Vista™, Microsoft NT™, AIX™, IBM's i5/OS™, and others as will occur to those of skill in the art. There is no requirement that the operating system in the host computers should be the same operating system used on the accelerators.

The processor (148) of each accelerator (104, 105) has a set of architectural registers (150) that defines the accelerator architecture. The architectural registers (150) of the processor (148) of each accelerator are different from the architectural registers (154) of the processor (152) in the host computer (110). With differing architectures, it would be uncommon, although possible, for a host computer and an accelerator to support the same instruction sets. As such, computer program instructions compiled for execution on the processor (148) of an accelerator (104) generally would not be expected to execute natively on the processor (152) of the host computer (110) and vice versa. Moreover, because of the typical differences in hardware architectures between host processors and accelerators, computer program instructions compiled for execution on the processor (152) of a host computer (110) generally would not be expected to execute natively on the processor (148) of an accelerator (104) even if the accelerator supported the instruction set of the host. The accelerator architecture in example of FIG. 2 is optimized, with respect to the host computer architecture, for speed of execution of a particular class of computing functions. That is, for the function or functions for which the accelerator is optimized, execution of those functions will proceed faster on the accelerator than if they were executed on the processor of the host computer.

In the example of FIG. 2, the host computer (110) and the accelerators (104, 105) are adapted to one another for data communications by a system level message passing module ('SLMPM') (146) and two data communications fabrics (128, 130) of at least two different fabric types. In this example, to support message-based data communications between the host computer (110) and the accelerator (104), both the host computer (110) and the accelerator (104) have an SLMPM (146) so that message-based communications can both originate and be received on both sides of any coupling for data communications. Also in the example of FIG. 2, the host computer (110) and the accelerators (104, 105) are adapted to one another for data communications by a PCIe fabric (130) through PCIe communications adapters (160) and an Ethernet fabric (128) through Ethernet communications adapters (161). The use of PCIe and Ethernet is for explanation, not for limitation of the invention. Readers of skill in the art will immediately recognize that hybrid computing environments according to embodiments of the present invention may include fabrics of other fabric types such as, for example, PCI, Infiniband, Fibre Channel, SCSI, eSATA, USB, and so on.

The SLMPM (146) in this example operates generally for data processing in a hybrid computing environment (100) by monitoring data communications performance for a plurality of data communications modes between the host computer (110) and the accelerators (104, 105), receiving a request (168) to transmit data according to a data communications mode from the host computer to an accelerator, determining whether to transmit the data according to the requested data communications mode, and if the data is not to be transmitted according to the requested data communications mode: selecting another data communications mode and transmitting the data according to the selected data communications mode. In the example of FIG. 2, the monitored performance is illustrated as monitored performance data (174) stored by the SLMPM (146) in RAM (142) of the host computer (110) during operation of the compute node (103).

A data communications mode specifies a data communications fabric type, a data communications link, and a data communications protocol (178). A data communications link (156) is data communications connection between a host computer and an accelerator. In the example of FIG. 2, a link (156) between the host computer (110) and the accelerator (104) may include the PCIe connection (138) or the Ethernet connection (131, 132) through the Ethernet network (106). A link (156) between the host computer (110) and the accelerator (105) in the example of FIG. 2 may include the PCIe connection (136) or the Ethernet connection (131, 134) through the Ethernet network (106). Although only one link for each fabric type is illustrated between the host computer and the accelerator in the example of FIG. 2, readers of skill in the art will immediately recognize that there may any number of links for each fabric type.

A data communications protocol is a set of standard rules for data representation, signaling, authentication and error detection required to send information from a host computer (110) to an accelerator (104). In the example of FIG. 2, the SLMPM (146) may select one of several protocols (178) for data communications between the host computer (110) and the accelerator. Examples of such protocols (178) include shared memory transfers ('SMT') (180) executed with a send and receive operations (181), and direct memory access ('DMA') (182) executed with PUT and GET operations (183).

Shared memory transfer is a data communications protocol for passing data between a host computer and an accelerator into shared memory space (158) allocated for such a purpose such that only one instance of the data resides in memory at any time. Consider the following as an example shared memory transfer between the host computer (110) and the accelerator (104) of FIG. 2. An application (166) requests (168) a transmission of data (176) from the host computer (110) to the accelerator (104) in accordance with the SMT (180) protocol. Such a request (168) may include a memory address allocated for such shared memory. In this example, the shared memory segment (158) is illustrated in a memory location on the accelerator (104), but readers will recognize that shared memory segments may be located on the accelerator (104), on the host computer (110), on both the host computer and the accelerator, or even off the local compute node (103) entirely—so long as the segment is accessible as needed by the host and the accelerator. To carry out a shared memory transfer, the SLMPM (146) on the host computer (110) establishes a data communications connection with the SLMPM (146) executing on the accelerator (104) by a handshaking procedure similar to that in the TCP protocol. The SLMPM (146) then creates a message (170) that includes a header and a payload data and inserts the message into a message transmit queue for a particular link of a particular fabric. In creating the message, the SLMPM inserts, in the header of the message, an identification of the accelerator and an identification of a process executing on the accelerator. The SLMPM also inserts the memory address from the request (168) into the message, either in the header or as part of the payload data. The SLMPM also inserts the data (176) to be transmitted in the message (170) as part of the message payload data. The message is then transmitted by a communications adapter (160, 161) across a fabric (128, 130) to the SLMPM executing on the accelerator (104) where the SLMPM stores the payload data, the data (176) that was transmitted, in shared memory space (158) in RAM (140) in accordance with the memory address in the message.

Direct memory access ('DMA') is a data communications protocol for passing data between a host computer and an accelerator with reduced operational burden on the computer processor (152). A DMA transfer essentially effects a copy of a block of memory from one location to another, typically from a host computer to an accelerator or vice versa. Either or both a host computer and accelerator may include DMA engine, an aggregation of computer hardware and software for direct memory access. Direct memory access includes reading and writing to memory of accelerators and host computers with reduced operational burden on their processors. A DMA engine of an accelerator, for example, may write to or read from memory allocated for DMA purposes, while the processor of the accelerator executes computer program instructions, or otherwise continues to operate. That is, a computer processor may issue an instruction to execute a DMA transfer, but the DMA engine, not the processor, carries out the transfer.

In the example of FIG. 2, only the accelerator (104) includes a DMA engine (184) while the host computer does not. In this embodiment the processor (152) on the host computer initiates a DMA transfer of data from the host to the accelerator by sending a message according to the SMT protocol to the accelerator, instructing the accelerator to perform a remote 'GET' operation. The configuration illustrated in the example of FIG. 2 in which the accelerator (104) is the only device containing a DMA engine is for explanation only, not for limitation. Readers of skill in the art will immediately recognize that in many embodiments, both a host computer and an accelerator may include a DMA engine, while in yet other embodiments only a host computer includes a DMA engine.

To implement a DMA protocol in the hybrid computing environment of FIG. 2 some memory region is allocated for access by the DMA engine. Allocating such memory may be carried out independently from other accelerators or host computers, or may be initiated by and completed in cooperation with another accelerator or host computer. Shared memory regions, allocated according to the SMA protocol, for example, may be memory regions made available to a DMA engine. That is, the initial setup and implementation of DMA data communications in the hybrid computing environment (100) of FIG. 2 may be carried out, at least in part, through shared memory transfers or another out-of-band data communications protocol, out-of-band with respect to a DMA engine. Allocation of memory to implement DMA transfers is relatively high in latency, but once allocated, the DMA protocol provides for high bandwidth data communications that requires less processor utilization than many other data communications protocols.

A direct 'PUT' operation is a mode of transmitting data from a DMA engine on an origin device to a DMA engine on a target device. A direct 'PUT' operation allows data to be transmitted and stored on the target device with little involvement from the target device's processor. To effect minimal involvement from the target device's processor in the direct 'PUT' operation, the origin DMA engine transfers the data to be stored on the target device along with a specific identification of a storage location on the target device. The origin DMA knows the specific storage location on the target device because the specific storage location for storing the data on the target device has been previously provided by the target DMA engine to the origin DMA engine.

A remote 'GET' operation, sometimes denominated an 'rGET,' is another mode of transmitting data from a DMA engine on an origin device to a DMA engine on a target device. A remote 'GET' operation allows data to be transmitted and stored on the target device with little involvement from the origin device's processor. To effect minimal involvement from the origin device's processor in the remote 'GET' operation, the origin DMA engine stores the data in an storage location accessible by the target DMA engine, notifies the target DMA engine, directly or out-of-band through a shared memory transmission, of the storage location and the size of the data ready to be transmitted, and the target DMA engine retrieves the data from storage location.

Monitoring data communications performance for a plurality of data communications modes may include monitoring a number of requests (168) in a message transmit request queue (162-165) for a data communications link (156). In the example of FIG. 2, each message transmit request queue (162-165) is associated with one particular data communications link (156). Each queue (162-165) includes entries for messages (170) that include data (176) to be transmitted by the communications adapters (160, 161) along a data communications link (156) associated with queue.

Monitoring data communications performance for a plurality of data communications modes may also include monitoring utilization of a shared memory space (158). In the example of FIG. 2, shared memory space (158) is allocated in RAM (140) of the accelerator. Utilization is the proportion of the allocated shared memory space to which data has been stored for sending to a target device and has not yet been read or received by the target device, monitored by tracking the writes and reads to and from the allocated shared memory. In the hybrid computing environment (100) of FIG. 2, shared memory space, any memory in fact, is limited. As such, a shared memory space (158) may be filled during execution of an application program (166) such that transmission of data from the host computer (110) to an accelerator may be slowed, or even stopped, due to space limitations in the shared memory space.

In some embodiments of the present invention, the hybrid computing environment (100) of FIG. 2 may be configured to operate as a parallel computing environment in which two or more instances the host application program (166) executes on two or more host computers (110) in the parallel computing environment. In such embodiments, monitoring data communications performance across data communications modes may also include aggregating data communications performance information (174) across a plurality of instances of the host application program (166) executing on two or more host computers in a parallel computing environment. The aggregated performance information (174) may be used to calculate average communications latencies for data communications modes, average number of requests in data communications links of a particular fabric type, average shared memory utilization among the plurality of host computers and accelerators in the parallel computing environment, and so on as will occur to those of skill in the art. Any combination of such measures may be used by the SLMPM for both determining whether to transmit the data according to requested data communications mode and selecting another data communications mode for transmitting the data if the data is not to be transmitted according to the requested data communications mode.

The SLMPM (146) of FIG. 2 receives, from an application program (166) on the host computer (110), a request (168) to transmit data (176) according to a data communications mode from the host computer (110) to the accelerator (104). Such data (176) may include computer program instructions compiled for execution by the accelerator (104), work piece data for an application program executing on the accelerator (104), or some combination of computer program instructions and work piece data. Receiving a request (168) to transmit data (176) according to a data communications mode may include receiving a request to transmit data by a specified fabric type, receiving a request to transmit data through a specified data communications link from the host computer to the accelerator, or receiving a request to transmit data from the host computer to the accelerator according to a protocol.

A request (168) to transmit data (176) according to a data communications mode may be implemented as a user-level application function call through an API to the SLMPM (146), a call that expressly specifies a data communications mode according to protocol, fabric type, and link. A request implemented as a function call may specify a protocol according to the operation of the function call itself. A dacs_put( ) function call, for example, may represent a call through an API exposed by an SLMPM implemented as a DACS library to transmit data in the default mode of a DMA 'PUT' operation. Such a call, from the perspective of the calling application and the programmer who wrote the calling application, represents a request to the SLMPM library to transmit data according to the default mode, known to the programmer to be default mode associated with the express API call. The called function, in this example dacs_put( ), may be coded according to embodiments of the present invention, to make its own determination whether to transmit the data according to the requested data communications mode, that is, according to the default mode of the called function. In a further example, a dacs_send( ) instruction may represent a call through an API exposed by an SLMPM implemented as a DACS library to transmit data in the default mode of an SMT 'send' operation, where the called function dacs_send ( ) is again coded according to embodiments of the present invention to make its own determination whether to transmit the data according to the requested mode.

An identification of a particular accelerator in a function call may effectively specify a fabric type. Such a function call may include as a call parameter an identification of a particular accelerator. An identification of a particular accelerator by use of a PCIe ID, for example, effectively specifies a PCI fabric type. In another, similar, example, an identification of a particular accelerator by use of a media access control ('MAC') address of an Ethernet adapter effectively specifies the Ethernet fabric type. Instead of implementing the accelerator ID of the function call from an application executing on the host in such a way as to specify a fabric type, the function call may only include a globally unique identification of the particular accelerator as a parameter of the call, thereby specifying only a link from the host computer to the accelerator, not a fabric type. In this case, the function called may implement a default fabric type for use with a particular protocol. If the function called in the SLMPM is configured with PCIe as a default fabric type for use with the DMA protocol, for example, and the SLMPM receives a request to transmit data to the accelerator (104) according to the DMA protocol, a DMA PUT or DMA remote GET operation, the function called explicitly specifies the default fabric type for DMA, the PCIe fabric type.

In hybrid computing environments in which only one link of each fabric type adapts a single host computer to a single accelerator, the identification of a particular accelerator in a parameter of a function call, may also effectively specify a link. In hybrid computing environments where more than one link of each fabric type adapts a host computer and an accelerator, such as two PCIe links connecting the host computer (110) to the accelerator (104), the SLMPM function called may implement a default link for the accelerator identified in the parameter of the function call for the fabric type specified by the identification of the accelerator.

The SLMPM (146) in the example of FIG. 2 also determines, in dependence upon the monitored performance (174), whether to transmit the data (176) according to the requested data communications mode. Determining whether to transmit the data (176) according to the requested data communications mode may include determining whether to transmit data by a requested fabric type, whether to transmit data through a requested data communications link, or whether to transmit data according to a requested protocol.

In hybrid computing environments in which monitoring data communications performance across data communications modes includes monitoring a number of requests in a message transmit request queue (162-165) for a data communications link, determining whether to transmit the data (176) according to the requested data communications mode may be carried out by determining whether the number of requests in the message transmit request queue exceeds a predetermined threshold. In hybrid computing environments in which monitoring data communications performance for a plurality of data communications modes includes monitoring utilization of a shared memory space, determining whether to transmit the data (176) according to the requested data communications mode may be carried out by determining whether the utilization of the shared memory space exceeds a predetermined threshold.

If the data is not to be transmitted according to the requested data communications mode, the SLMPM (146) selects, in dependence upon the monitored performance, another data communications mode for transmitting the data and transmits the data (176) according to the selected data communications mode. Selecting another data communications mode for transmitting the data may include selecting, in dependence upon the monitored performance, another data communications fabric type by which to transmit the data, selecting a data communications link through which to transmit the data, and selecting another data communications protocol. Consider as an example, that the requested data communications mode is a DMA transmission using a PUT operation through link (138) of the PCIe fabric (130) to the accelerator (104). If the monitored data performance (174) indicates that the number of requests in transmit message request queue (162) associated with the link (138) exceeds a predetermined threshold, the SLMPM may select another fabric type, the Ethernet fabric (128), and link (131, 132) through which to transmit the data (176). Also consider that the monitored performance (176) indicates that current utilization of the shared memory space (158) is less than a predetermined threshold while the number of outstanding DMA transmissions in the queue (162) exceeds a predetermined threshold. In such a case, the SLMPM (146) may also select another protocol, such as a shared memory transfer, by which to transmit the data (174).

Selecting, by the SLMPM, another data communications mode for transmitting the data (172) may also include selecting a data communications protocol (178) in dependence upon data communications message size (172). Selecting a data communications protocol (178) in dependence upon data communications message size (172) may be carried out by determining whether a size of a message exceeds a predetermined threshold. For larger messages (170), the DMA protocol may be a preferred protocol as processor utilization in making a DMA transfer of a larger message (170) is typically less than the processor utilization in making a shared memory transfer of a message of the same size.

As mentioned above, the SLMPM may also transmit the data according to the selected data communications mode. Transmit the data according to the selected data communications mode may include transmitting the data by the selected data communications fabric type, transmitting the data through the selected data communications link, or transmitting the data according to the selected protocol. The SLMPM (146) may effect a transmission of the data according to the selected data communications mode by instructing, through a device driver, the communications adapter for the data communications fabric type of the selected data communications mode to transmit the message (170) according to a protocol of the selected data communications mode, where the message includes in a message header, an identification of the accelerator, and in the message payload, the data (176) to be transmitted.

The SLMPM (146) in the example of FIG. 2 operates generally for executing a service program for an accelerator application program (204) in the example hybrid computing environment (100). A 'service program' as the term is used in the specification is a module of computer program instructions capable of controlling or monitoring, at the level of individual computer program instructions, execution of an accelerator application program. The service program in the example of FIG. 2 includes a host portion (206) configured to execute on the host computer architecture and an accelerator portion (202) configured to execute on the accelerator architecture.

The SLMPM (146) in the example of FIG. 2, useful for executing a service program for an accelerator application program, may be capable of receiving, from the host portion (206) of the service program, operating information (210) for the accelerator portion of the service program; starting the accelerator portion of the service program on the accelerator; providing, to the accelerator portion (202) of the service program, operating information (212) for the accelerator application program (204); and establishing direct data communications between the host portion (206) of the service program and the accelerator portion (202) of the service program.

An 'accelerator' application program (204) is a module of computer program instructions executed on an accelerator that performs one or more tasks, typically but not necessarily, for the benefit of a host application program (166) that requests execution of the accelerator application program. A 'host' application program, by contrast, is an application that runs on a host computer and may request execution of one or more accelerator application programs for its own benefit. An accelerator typically processes the accelerator application program in an accelerated fashion, that is, the accelerator carries out one or more functions of the accelerator application program faster than the functions would normally be processed by a host computer due to the fact that the accelerator's architecture is optimized, with respect to the host computer architecture, for speed of execution of the one or more functions.

Accelerator application programs executed in accordance with embodiments of the present invention may be standalone modules of computer program instructions or modules of computer program instructions that would otherwise be executed at the behest of a host application program. The accelerator application program (202) of FIG. 2, for example, may be a standalone module of computer program instructions configured for execution on the accelerator (104) or a module of computer program instructions that, but for the operation of the service program (202, 206), would otherwise be executed at the behest of the host application program (166) executing on the host computer (110).

In hybrid computing environment (100) according to various embodiments of the present invention in which the accelerator application program (204) is a module of computer program instructions that would otherwise be executed at the behest of a host application program (166), the host portion (206) of the service program may provide service program services with regard to the host application program (204). A host portion (206) of a service program implemented as a debugger, for example, in embodiments in which the accelerator application program (204) is a module of computer program instructions that would otherwise be executed at the behest of a host application program (166), may provide, among other services, debug functionality with regard to the host application program (166) and the accelerator portion (202) of the service program may provide, among other services, debug functionality with regard to the accelerator application program (204).

As mentioned above, the SLMPM (146) of FIG. 2 may be capable of receiving, from the host portion (206) of the service program, operating information for the accelerator portion (202) of the service program. 'Operating information' as the term is used in the specification refers to information used in starting, maintaining, and terminating execution of software programs, such as a service program, host application program, accelerator application program and the like, in the hybrid computing environment (100). Operating information (212) for the accelerator portion (202) of the service program may include execution parameters for the accelerator portion of the service program, environment variables for the accelerator portion of the service program, a name of the accelerator portion of the service program, an identity of an accelerator, a list of files to transfer to the accelerator for executing the accelerator portion of the service program, and so on as will occur to readers of skill in the art.

Application execution parameters, sometimes referred to as execution arguments, are parameters provided to a newly executed application program and used throughout execution of the program. Examples of such parameters include text, names of application programs, paths to the application program executable files, paths to configuration files, Uniform Resource Locators ('URLs') identifying locations of files, data communications parameters such as an data communications port for the accelerator portion (202) of the service program, and so on as will occur to readers of skill in the art.

Environment variables (206) are a set of dynamic values than may affect the way an accelerator application program behaves while running on an accelerator. Examples of environment variables include:

PATH, a variable that represents a list of directories in which executable files to be executed are located;

HOME, a variable that represents a path to a user's home directory in a file system;

TEMP, a variable that represents a path to a directory to store temporary files;

USERNAME, a variable that represents the username associated with the current user;

USERPROFILE a variable that represents a path to a directory in which the current user's profile is stored;

LD_LIBRARY_PATH for Unix, a variable that represents a list of directories that a dynamic linker should search for shared objects when building a process image after an 'exec' system command, before searching other directories; and Other variables as will occur to readers of skill in the art.

The name of the accelerator portion (202) of the service program is a name of the executable file of the accelerator portion (202) of the service program. An identity of an accelerator may be PCIe ID, a MAC address of an Ethernet adapter of an accelerator, World Wide Name ('WWN') or World Wide Identifier ('WWID'), or any implementation-specific globally unique identification, and so on, of an accelerator on which the accelerator portion (202) of the service program is to be executed. A list of files to transfer to the accelerator may be implemented as a list of pointers to file locations, Unix-like paths for example. Such files may include work piece data for the accelerator portion (202) of the service program, an executable file of the accelerator portion of the service program, an executable file of an accelerator application program (204), one or more configuration files used by an the accelerator application during its execution, library files for proper execution of accelerator portion of the service program, library files for proper execution of the accelerator application program, files containing various user settings, and so on as will occur to those of skill in the art.

The example SLMPM (146) of FIG. 2 may receive, from the host portion (206) of the service program, operating information (210) for the accelerator portion of the service program by receiving, from the host portion of the service program through an API, a function call to an SLMPM function with parameters that identify operating information. The following function call, written in pseudocode for clarity of explanation, is an example of a function call with parameters that identify operating information for the accelerator portion of the service program: dacs_de_start (Acc_ID_1, "AcceleratorServiceAppn", "ArgList", "VarsList"). This example function call is 'pseudocode,' so called because it is an explanation expressed in the form of code as opposed to an actual working model of computer code. This pseudocode is an example of a call to a DACS library function called 'de_start' which starts execution of the accelerator portion (202) of the service program on an accelerator (104). The parameters of the function include an identity of the accelerator, 'ACC_ID_1,' a name of an accelerator portion of the service program, 'AcceleratorServiceAppn,' a pointer to a file named 'ArgList' that contains a list of execution parameters, and a pointer to a file named 'VarsList' that contains a list of environment variables.

In embodiments of present invention in which an accelerator application program (204) would be executed at the behest of a host application program (166) but for operation of a service program in accordance with embodiments of the present invention, the host portion (206) of the service program may call an SLMPM (146) function to start the accelerator portion (202) upon intercepting, during serviced execution of the host application program (166), a call to start the accelerator application program (204). 'Serviced execution' of the host application program (166) means that the host application program (166) is running under control or monitor of the host portion (206) of the service program. Such a call from the host application program (166) to start an accelerator application program (204) may include operating information (210) for the accelerator application program (204).

The example SLMPM (146) of FIG. 2 may start the accelerator portion of the service program on the accelerator (104) by executing a Unix-type 'fork' system command, forking the SLMPM (146) into two processes, where the forked process calls a Unix-type 'exec' system command, using as an argument to the 'exec' system command, the name of the executable file of the accelerator portion of the service program. The fork-exec system commands may be carried out such that the calling process, the SLMPM (146) on the accelerator (104), receives upon completion of fork-exec command, the process identifier ('PID') of the newly executed process, the accelerator portion (202) of the service program. The SLMPM (146) may then pass the PID to the host portion (206) as a return value of the function called for starting the accelerator portion (202). Readers of skill in the art will recognize that the 'fork' and 'exec' system commands described here are used for clarity of explanation only, not limitation and also that other system commands for other operating systems, such as the 'spawn' system command in Windows operating systems, may be used for similar purposes.

The example SLMPM (146) of FIG. 2 may provide, to the accelerator portion (202) of the service program, operating information (212) for the accelerator application program (204) by transferring, responsive to a function call to start the accelerator portion (202) of the service program, one or more files that include the operating information (210) for the accelerator application program (204), where the one or more transferred files that include the operating information for the accelerator application program are identified by a parameter of the function call, configured as a list of files to transfer from the host computer to the accelerator. That is, the operating information (210) for the accelerator application program (204) may be transferred to the accelerator (104) and the accelerator portion (202) of the service program, from the host computer (110), along with, or as a part of, the operating information (212) for the accelerator portion (202) of the service program itself. Files transferred from the host computer (110) to the accelerator (104) responsive to a function call to start the accelerator portion (202) of the service program may include such example operating information for the accelerator application as execution parameters for the accelerator application program, environment variables for the accelerator application program, executable files of the accelerator application program, the name of the accelerator application program, a unique identification of the accelerator application associated with the host portion, accelerator portion, or host application program, and so on as will occur to readers of skill in the art.

The example SLMPM (146) of FIG. 2 may establish direct data communications between the host portion (206) of the service program and the accelerator portion (202) of the service program by specifying data communications parameters (214) for the accelerator portion (202) of the service program and providing, to the host portion of the service program, the specified data communications parameters (214) for the accelerator portion of the service program. In example embodiment, the SLMPM (146) of FIG. 2 may assign an IP address to the accelerator portion (202) of the service program and a listening port, if not already specified in the operating information of the accelerator portion (202) of the service program as described above. Upon specification of the IP address and port number of the SLMPM may provide, to the host portion (206) of the service program, the specified data communications parameters (214) for the accelerator portion of the service program by providing, as a return value of a function call to start the accelerator portion of the service program, the IP address of the accelerator portion of the service program. With an IP address and a listening port for the accelerator portion, a TCP socket, the host portion may establish a direct TCP connection with the accelerator portion (202) of the service program.

When direct data communications between the host (206) and accelerator (202) portions of the service program are established, the host portion (206) of the service program may directly instruct the accelerator portion (202) of the service program to execute the accelerator application program (204). That is, responsive to an instruction (208) communicated directly from the host portion (206) of the service program, the accelerator portion (202) of the service program may execute the accelerator application program (204) according to embodiments of the present invention. The accelerator portion (202) of the service program may execute the accelerator application program (204) according to embodiments of the present invention by executing a Unix-type fork-exec set of system commands where the forked process calls the exec system command with the name of the accelerator application program (204) as its argument.

The example SLMPM (146) of FIG. 2 may also receive, from the host portion (206) of the service program, a request to register the host portion (206) with the SLMPM (146) for notifications regarding operation of the accelerator portion (202) of the service program. The SLMPM may receive such a request to register the host portion (206) with the SLMPM (146) for notifications regarding operation of the accelerator portion (202) of the service program by receiving the request, from the host portion of the service program through an API, as a function call to an SLMPM function with parameters that include an identity of the accelerator portion of the service program. A parameter that includes the identity of the accelerator portion (202) of the service program may include a unique identification known to the accelerator portion and the SLMPM, a combination of the name of the accelerator portion and an identification of the accelerator on which the accelerator portion is executing, a combination of a PID of the accelerator portion and the identification of the accelerator on which the accelerator portion is executing, a combination of an IP address of the accelerator ID and the identification of the accelerator on which the accelerator portion is executing, and in other ways as will occur to readers of skill in the art. The request may also specify particular notification types for which the host portion should be notified, such as for example, notifications upon errors in the accelerator application program and the like.

In contrast to embodiments of the prior art in which values of execution parameters and environment variables of an accelerator application program executed at the behest of a host application program are varied by the host application program prior to starting the accelerator application on the accelerator, the example host portion (206) of FIG. 2 is capable of varying one or more values of the execution parameters and environment variables for the accelerator application program (204) before executing, by the accelerator portion of the service program, the accelerator application program. That is, values of environment variables and execution parameters of an accelerator application program may be varied, without altering computer program instructions of a previously compiled host application program, or altering the host application program in any other way. The example host portion (206) of FIG. 2 may vary one or more values of the execution parameters and environment variables for the accelerator application program (204) by identifying in the instruction (208) communicated directly form the host portion (206) of the service program to the accelerator portion of the service program to execute the accelerator application program, the alternative values of the execution parameters and environment variables for the accelerator application program (204). Varying one or more values of the execution parameters and environment variables for the accelerator application program (204) may also include transferring from the host portion directly to the accelerator portion, one or more files that comprise alternative operating information or are referenced by alternative values of the execution parameters and environment variables.

Though not depicted in the example of FIG. 2, the host portion (206) of the service program may comprise a client portion and a server portion where the server portion executes on the host computer (110) and the client portion executes on a computer separate from the host computer, such as the terminal (120) on FIG. 1. The client portion may provide a user interface enabling a user to set interrupts in host or accelerator application program, vary values of execution parameters, environment variables, and otherwise control or monitor the execution of an application program executing in the hybrid computing environment.

Figure 3:
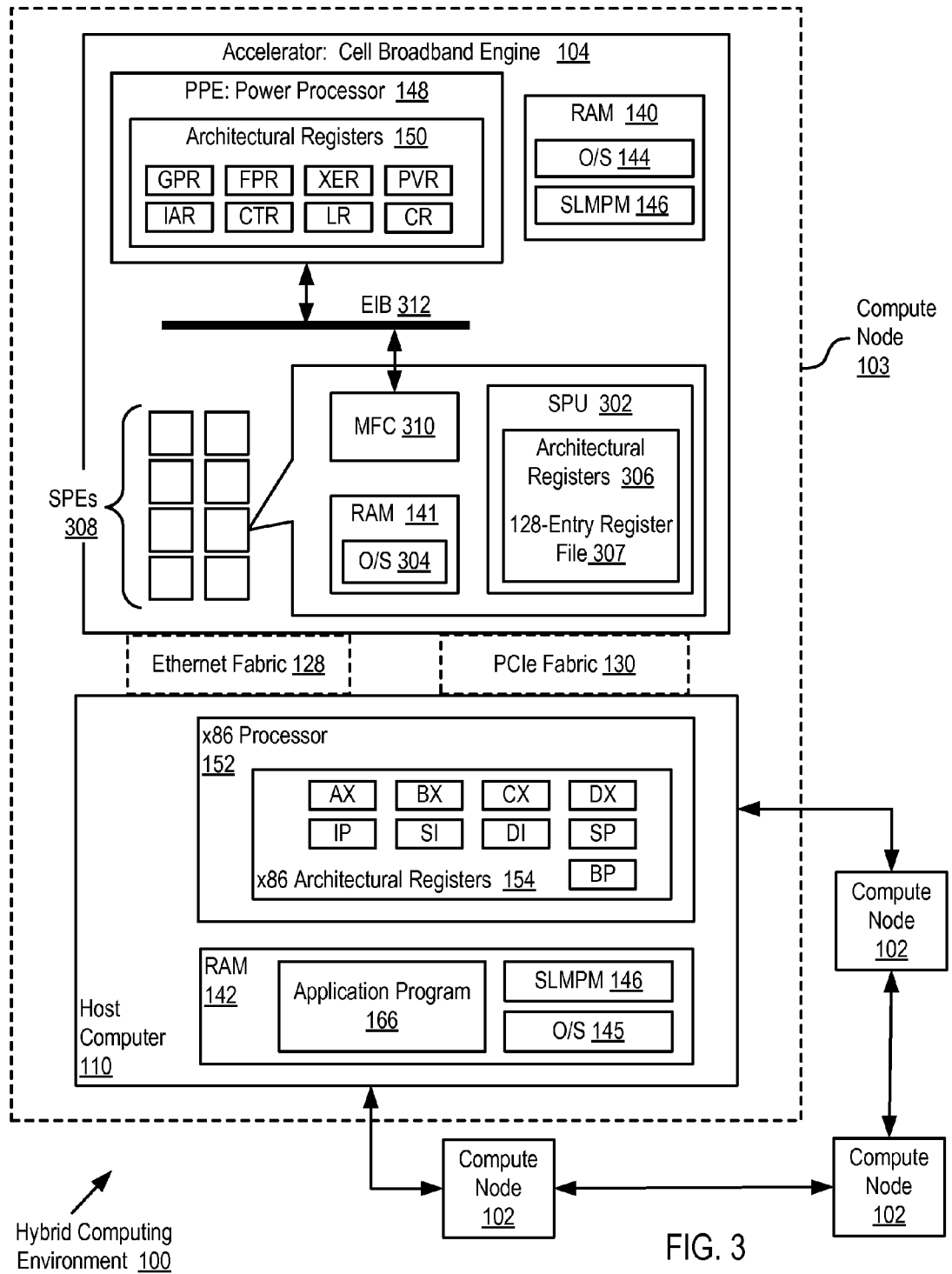
FIG. 3 sets forth a block diagram of a further exemplary hybrid computing environment useful for executing a service program for an accelerator application program according to embodiments of the present invention.

For further explanation, FIG. 3 sets forth a block diagram of a further exemplary hybrid computing environment (100) useful for executing a service program for an accelerator application program according to embodiments of the present invention. The hybrid computing environment of FIG. 3 is similar the hybrid computing environment of FIG. 2, including as it does, four compute nodes (102, 103), each of which includes a host computer (110) having a host computer architecture and an accelerator (104) having an accelerator architecture where the accelerator architecture is optimized, with respect to the host computer architecture, for speed of execution of a particular class of computing functions. The host computer (110) and the accelerator (104) are adapted to one another for data communications by a system level message passing module (146) and two or more data communications fabrics (128, 130) of at least two different fabric types. In the example of FIG. 3, the host computer (110) is adapted to accelerator (104) by an Ethernet fabric (128) and a PCIe fabric (130).

The host computer (110) as illustrated in the expanded view of the compute node (103) includes an x86 processor. An x86 processor is a processor whose architecture is based upon the architectural register set of the Intel x86 series of microprocessors, the 386, the 486, the 586 or Pentium™, and so on. Examples of x86 processors include the Advanced Micro Devices ('AMD') Opteron™, the AMD Phenom™, the AMD Athlon XP™, the AMD Athlon 64™, Intel Nehalam™, Intel Pentium 4, Intel Core 2 Duo, Intel Atom, and so on as will occur to those of skill in the art. The x86 processor (152) in the example of Figure illustrates a set of a typical architectural registers (154) found in many x86 processors including, for example, an accumulator register ('AX'), a base register ('BX'), a counter register ('CX'), a data register ('DX'), a source index register for string operations ('SI'), a destination index for string operations('DI'), a stack pointer ('SP'), a stack base pointer for holding the address of the current stack frame ('BP'), and an instruction pointer that holds the current instruction address ('IP').

The accelerator (104) in the example of FIG. 3 is illustrated as a Cell Broadband Engine ('CBE') having a Cell Broadband Engine Architecture ('CBEA'). A CBEA is a microprocessor architecture jointly developed by Sony Computer Entertainment, Toshiba, and IBM, an alliance known as "STI." Microprocessors implemented according to the CBEA are sometimes referred to as 'Cell' processors or simply as CBEs. The CBEA combines a general-purpose POWER architecture core, a Power Processing Element ('PPE') (148), of modest performance with streamlined co-processing elements, called Synergistic Processing Elements ('SPEs') (308) which greatly accelerate multimedia and vector processing applications, as well as many other forms of dedicated computation. The CBE architecture emphasizes efficiency/watt, prioritizes bandwidth over latency, and favors peak computational throughput over simplicity of program code.

The accelerator (104) of FIG. 3, implemented as a CBE, includes a main processor (148) that in this example is a Power Processing Element ('PPE'), eight fully-functional co-processors called SPEs (308), and a high-bandwidth circular data bus connecting the PPE and the SPEs, called the Element Interconnect Bus ('EIB') (312). The PPE (148) is a POWER architecture processor with a two-way multi-threaded core acting as a controller for the eight SPEs (308). The term "POWER architecture" here refers to IBM's different generations of processor architectures, a broad term including all products based on POWER, PowerPC and Cell architectures. The architectural registers (150) of the PPE (148) of the CBE accelerator (104) therefore are different from those of the x86 processor (152) of the host computer (110). The PPE (148) of FIG. 3 includes an example set of architectural registers (150) of the POWER architecture, including 32 general purpose registers ('GPRs'), 32 floating point registers ('FPRs'), a fixed-point exception register ('XER'), a count register ('CTR'), a Condition register ('CR'), an instruction address register ('IAR'), a link register ('LR'), and a processor version register ('PVR').

The SPEs (308) handle most of the computational workload of the CBE (104). While the SPEs are optimized for vectorized floating point code execution, the SPEs also may execute operating systems, such as, for example, a lightweight, modified version of Linux with the operating system stored in local memory (141) on the SPE. Each SPE (308) in the example of FIG. 3 includes a Synergistic Processing Unit ('SPU') (302), and a Memory Flow Controller ('MFC') (310). An SPU (302) is a Reduced Instruction Set Computing ('RISC') processor with 128-bit single instruction, multiple data ('SIMD') organization for single and double precision instructions. In some implementations, an SPU may contain a 256 KB embedded Static RAM (141) for instructions and data, called local storage which is visible to the PPE (148) and can be addressed directly by software. Each SPU (302) can support up to 4 Gigabyte ('GB') of local store memory. The local store does not operate like a conventional CPU cache because the local store is neither transparent to software nor does it contain hardware structures that predict which data to load. The SPUs (302) also implement architectural registers (306) different from those of the PPE which include a 128-bit, 128-entry register file (307). An SPU (302) can operate on 16 8-bit integers, 8 16-bit integers, 4 32-bit integers, or 4 single precision floating-point numbers in a single clock cycle, as well as execute a memory operation.

The MFC (310) integrates the SPUs (302) in the CBE (104). The MFC (310) provides an SPU with data transfer and synchronization capabilities, and implements the SPU interface to the EIB (312) which serves as the transportation hub for the CBE (104). The MFC (310) also implements the communication interface between the SPE (308) and PPE (148), and serves as a data transfer engine that performs bulk data transfers between the local storage (141) of an SPU (302) and CBE system memory, RAM (140), through DMA. By offloading data transfer from the SPUs (302) onto dedicated data transfer engines, data processing and data transfer proceeds in parallel, supporting advanced programming methods such as software pipelining and double buffering. Providing the ability to perform high performance data transfer asynchronously and in parallel with data processing on the PPE (148) and SPEs (302), the MFC (310) eliminates the need to explicitly interleave data processing and transfer at the application level.

The SLMPM (146) in the example of FIG. 3 processes data in the hybrid computing environment (100) invention by monitoring data communications performance for a plurality of data communications modes between the host computer (110) and the accelerator (104); receiving, from an application program (166) on the host computer (110), a request to transmit data according to a data communications mode from the host computer (110) to the accelerator (104); determining, in dependence upon the monitored performance, whether to transmit the data according to the requested data communications mode; and if the data is not to be transmitted according to the requested data communications mode: selecting, in dependence upon the monitored performance, another data communications mode for transmitting the data and transmitting the data according to the selected data communications mode.

The SLMPM (146) and an accelerator portion of a service program may operate generally for executing a service program for an accelerator application program in the hybrid computing environment (100) of FIG. 3 according to embodiments of the present invention. A service program executed in the example hybrid computing environment (100) of FIG. 3 may include a host portion configured to execute on the host computer architecture and an accelerator portion configured to execute on the accelerator architecture. The SLMPM may receive, from the host portion of the service program, operating information for the accelerator portion of the service program; start the accelerator portion of the service program on the accelerator; provide, to the accelerator portion of the service program, operating information for the accelerator application program; and establish direct data communications between the host portion of the service program and the accelerator portion of the service program. Upon establishing direct data communications between the host portion and accelerator portion and responsive to an instruction communicated directly from the host portion, the accelerator portion of the service program may execute the accelerator application program.

Figure 4:
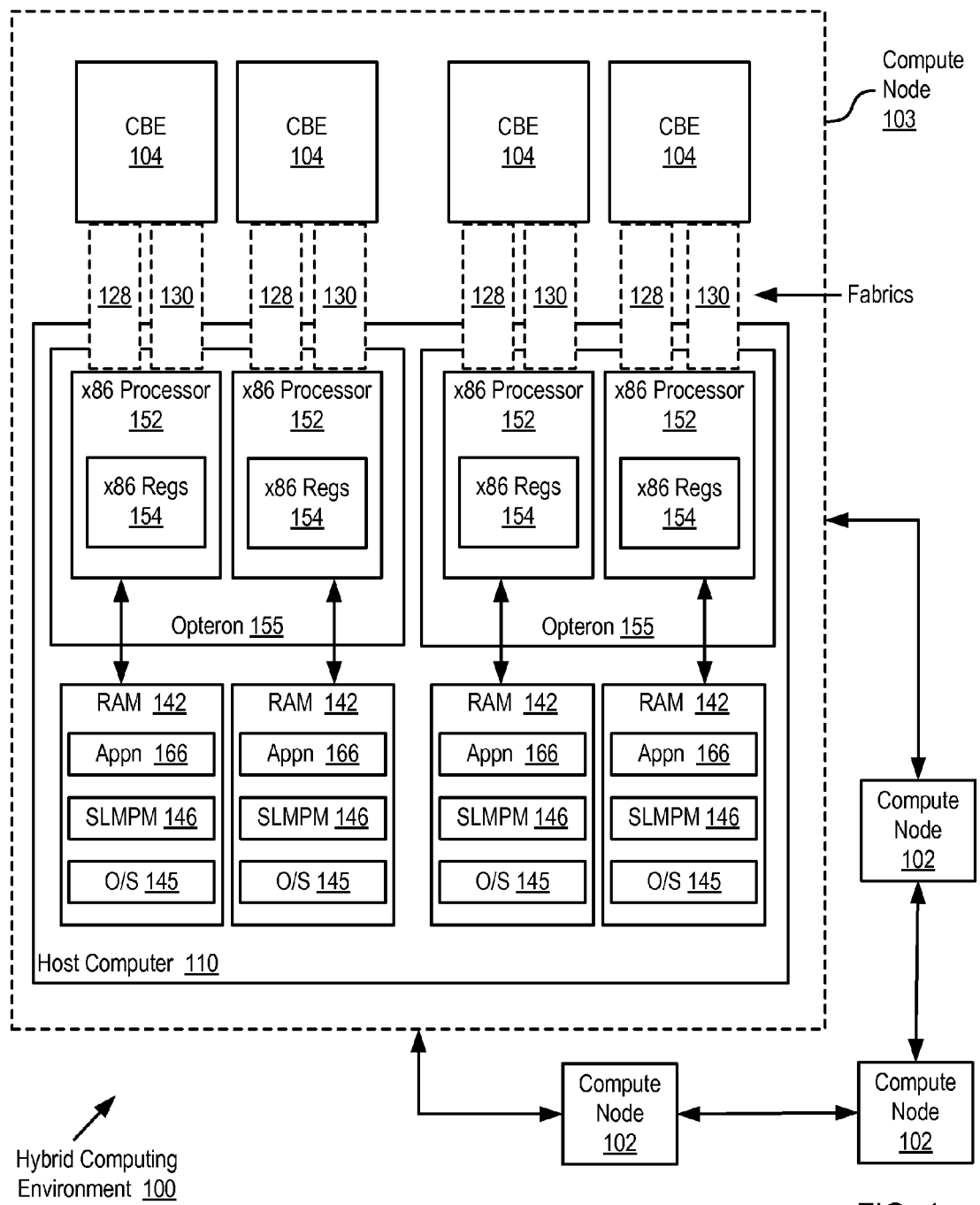
FIG. 4 sets forth a block diagram of a further exemplary hybrid computing environment useful for executing a service program for an accelerator application program according to embodiments of the present invention.

For further explanation, FIG. 4 sets forth a block diagram of a further exemplary hybrid computing environment (100) useful for executing a service program for an accelerator application program according to embodiments of the present invention. The hybrid computing environment of FIG. 4 is similar the hybrid computing environment of FIG. 2, including as it does, four compute nodes (102, 103), each of which includes a host computer (110) having a host computer architecture and one or more accelerators (104) each having an accelerator architecture where the accelerator architecture is optimized, with respect to the host computer architecture, for speed of execution of a particular class of computing functions. The host computer (110) and the accelerator (104) in the example of FIG. 4 are adapted to one another for data communications by a system level message passing module (146) and two or more data communications fabrics (128, 130) of at least two different fabric types. In the example of FIG. 4, the host computer (110) is adapted to accelerator (104) by an Ethernet fabric (128) and a PCIe fabric (130).

FIG. 4 illustrates an example of a hybrid computing environment similar to that implemented in the LANL supercomputer. The host computer (110), as illustrated by the expanded view of the compute node (103), implemented in the LANL supercomputer includes two AMD Opteron processors (155), each of which is a dual-core processor. Each of the cores (152) of the host computer (110) is illustrated in the example of FIG. 4 as a single, fully functional x86 processor core with each core having its own set of architectural registers (154). Each of the processor cores (152) in the example of FIG. 4 is operatively coupled to RAM (142) where an instance of an application program (166), an instance of the SLMPM (146), and an operating system (145) is stored. In the example of the LANL supercomputer, the SLMPM (146) is the Data Communication and Synchronization ('DACS') library improved according to embodiments of the present invention.

Each x86 processor core (152) in the example of FIG. 4 is adapted through an Ethernet (128) and PCIe (130) fabric to a separate accelerator (104) implemented as a CBE as described above with respect to FIG. 3. Each core (152) of each AMD Opteron processor (155) in the host computer (110) in this example is connected to at least one CBE. Although in this example the ratio of cores of the Opteron processors to CBEs (104) is one-to-one, readers of skill in the art will recognize that other example embodiments may implement different ratios of processor cores to accelerators such as, for example, one-to-two, one-to-three, and so on.

Each instance of the SLMPM (146) executing on each x86 processor core (152) in the example of FIG. 4 processes data in the hybrid computing environment (100) by monitoring data communications performance across data communications modes between the host computer (110) and the accelerator (104) connected to the processor core (152); receiving, from the instance of the application program (166) executing on the processor core (152) of the host computer (110), a request to transmit data according to a data communications mode from the host computer (110) to the accelerator (104) connected to the processor core (152); determining, in dependence upon the monitored performance, whether to transmit the data according to the requested data communications mode; and if the data is not to be transmitted according to the requested data communications mode: selecting, in dependence upon the monitored performance, another data communications mode for transmitting the data and transmitting the data according to the selected data communications mode.

The SLMPM (146) and an accelerator portion of a service program may operate generally for executing a service program for an accelerator application program in the hybrid computing environment (100) of FIG. 4 according to embodiments of the present invention. A service program executed in the example hybrid computing environment (100) of FIG. 4 may include a host portion configured to execute on the host computer architecture and an accelerator portion configured to execute on the accelerator architecture. The SLMPM may receive, from the host portion of the service program, operating information for the accelerator portion of the service program; start the accelerator portion of the service program on the accelerator; provide, to the accelerator portion of the service program, operating information for the accelerator application program; and establish direct data communications between the host portion of the service program and the accelerator portion of the service program. Upon establishing direct data communications between the host portion and accelerator portion and responsive to an instruction communicated directly from the host portion, the accelerator portion of the service program may execute the accelerator application program.

Figure 5:
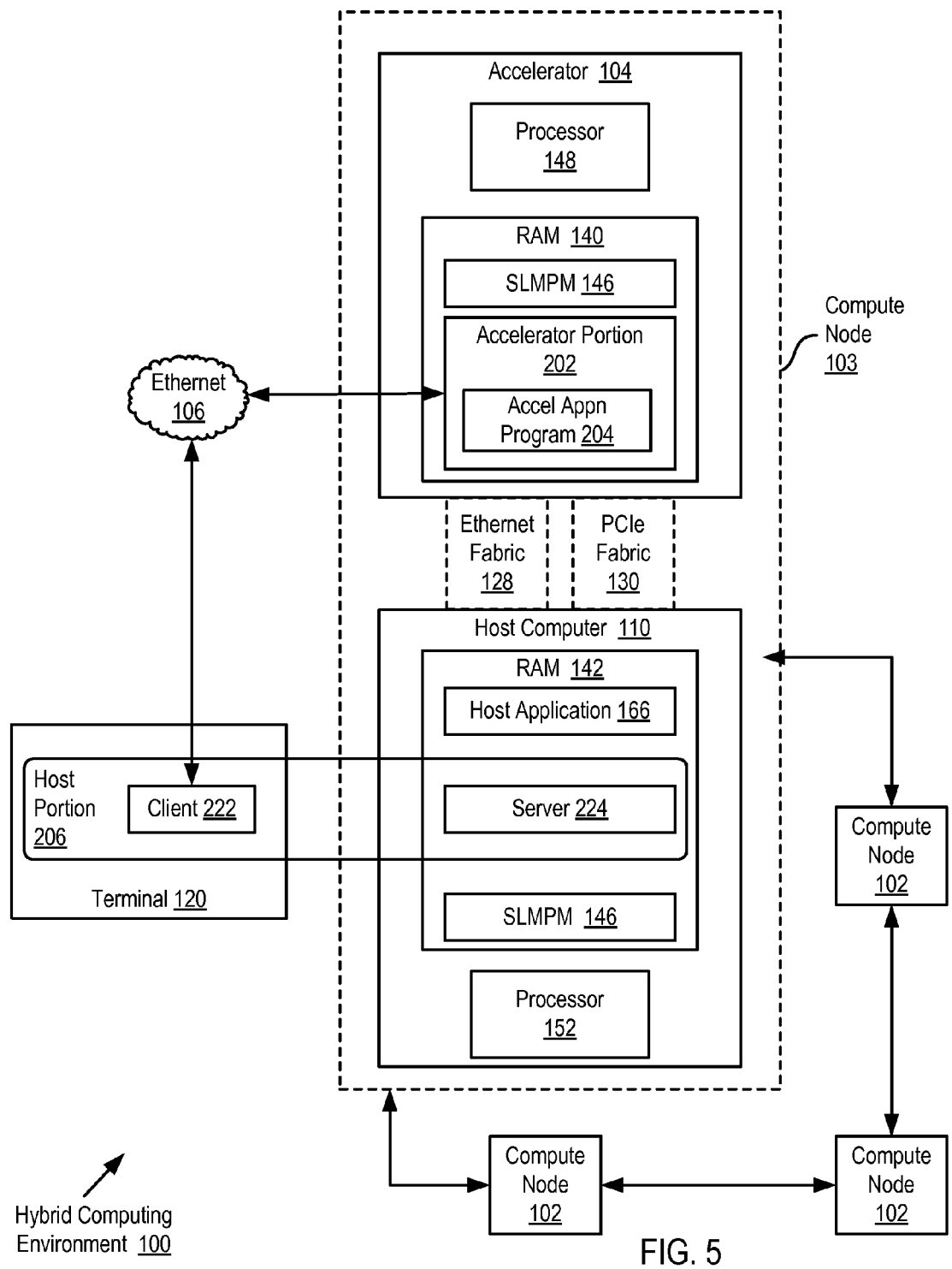
FIG. 5 sets forth a block diagram of a further exemplary hybrid computing environment useful for executing a service program for an accelerator application program according to embodiments of the present invention.

For further explanation, FIG. 5 sets forth a block diagram of a further exemplary hybrid computing environment (100) useful for executing a service program for an accelerator application program according to embodiments of the present invention. The hybrid computing environment of FIG. 4 is similar the hybrid computing environment of FIG. 2, including as it does, four compute nodes (102, 103), each of which includes a host computer (110) having a host computer architecture and one or more accelerators (104) each having an accelerator architecture where the accelerator architecture is optimized, with respect to the host computer architecture, for speed of execution of a particular class of computing functions. The host computer (110) and the accelerator (104) in the example of FIG. 4 are adapted to one another for data communications by a system level message passing module (146) and two or more data communications fabrics (128, 130) of at least two different fabric types. In the example of FIG. 4, the host computer (110) is adapted to accelerator (104) by an Ethernet fabric (128) and a PCIe fabric (130).

The hybrid computing environment of FIG. 5 differs from the hybrid computing environment of FIG. 2, however, in that the host portion (206) of the service program of FIG. 5 is a combination of a server portion (224) and a client portion (222). The server portion (224) of the host portion (206) of the service program executes on the host computer (110). The client portion (222) of the host portion (206) of the service program executes on a computer separate from the host computer (110), a terminal (120).

Establishing by the system level message passing module (146) direct data communications between the host portion (206) of the service program and the accelerator portion of the service program in the example hybrid computing environment of FIG. 5 includes providing, data communications parameters, such as an IP address of the accelerator portion (202) of the service program, to the server portion (224) executing on the host computer (110), where the server portion (224) passes the data communications parameters along to the client portion (222) of the host portion (206) of the service program. The client portion (222) executing on the terminal then may establish direct data communications with the accelerator portion (202) of the service program such as a TCP socket connection through an Ethernet network (106). When direct data communications are established between the client portion of the service program and the accelerator portion of the service program, at least some, if not at all, data communications between the host portion of the service program and the accelerator portion of the service program may be carried out without any participation from the server portion of the service program executing on the host computer.

The client-server architecture of the host portion of the service program illustrate in the example of FIG. 5 enables the service program to provide through the client portion (222) a service program user interface on a computer located physically separate from the compute node (103) on which the accelerator application program executes. That is, the client portion (222) may be configured to accept and provide user input to the server (224) portion and the accelerator portion (202) of the service program for controlling service program operation with respect to the host application program (166) and the accelerator application program (204).

Figure 6:
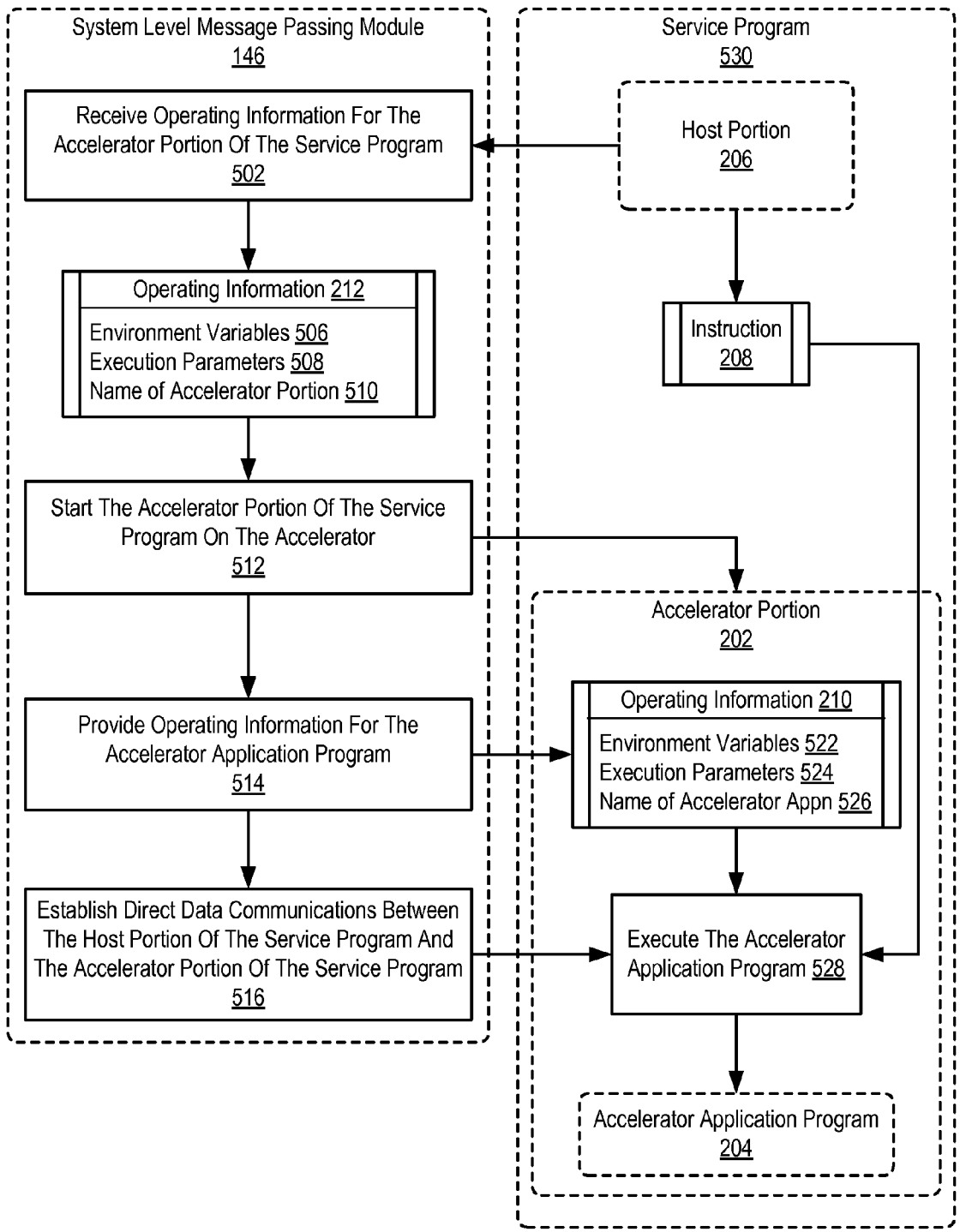
FIG. 6 sets forth a flow chart illustrating an exemplary method for executing a service program for an accelerator application program in a hybrid computing environment according to embodiments of the present invention.

For further explanation, FIG. 6 sets forth a flow chart illustrating an exemplary method for executing a service program for an accelerator application program in a hybrid computing environment according to embodiments of the present invention. The method of FIG. 6 is carried out in a hybrid computing environment similar to the hybrid computing environments described above in this specification. Such a hybrid computing environment may include a host computer (110 on FIG. 2) having a host computer architecture and an accelerator (104 on FIG. 2) having an accelerator architecture, the accelerator architecture optimized, with respect to the host computer architecture, for speed of execution of a particular class of computing functions, the host computer (110 on FIG. 2) and the accelerator (104 on FIG. 2) adapted to one another for data communications by an SLMPM (146 on FIG. 2), and, optionally, two or more data communications fabrics (128, 130 on FIG. 2) of at least two different fabric types.

The service program (530) in the example of FIG. 6 is a module of computer program instructions capable of controlling or monitoring, at the level of individual computer program instructions, execution of an accelerator application program (204). The service program (530) in the example of FIG. 6 includes a host portion (206) configured to execute on the host computer architecture and an accelerator portion (202) configured to execute on the accelerator architecture.

The method of FIG. 6 includes receiving (502), by the system level message passing module (146) from the host portion (206) of the service program (530), operating information (212) for the accelerator portion (202) of the service program (530). The operating information (212) for the accelerator portion (212) of the service program in the method of FIG. 6 includes environment variables (506), execution parameters (508) and a name of the accelerator portion (510) of the service program (530). The operating information (212) may also include a list of files to transfer from the host computer to the accelerator including, for example, the executable file for the accelerator portion of the service program (530), the executable file for the accelerator application program (204), and so on.

The method of FIG. 6 also includes starting (512), by the system level message passing module (146), the accelerator portion (206) of the service program (530) on the accelerator. Starting (512), by the system level message passing module (146), the accelerator portion (206) of the service program (530) on the accelerator may be carried out by executing a Unix-type fork-exec set of system commands, using as an argument to the 'exec' system command, the name of the executable file of the accelerator portion of the service program (530).

The method of FIG. 6 also includes providing (514), by the system level message passing module (146) to the accelerator portion (202) of the service program (530), operating information (210) for the accelerator application program (204).

The operating information (210) for the accelerator application program (204) in the example of FIG. 6 includes environment variables (522), execution parameters (524) and a name (526) of the accelerator application program (204). Providing (514), by the system level message passing module (146) to the accelerator portion (202) of the service program (530), operating information (210) for the accelerator application program (204) may be carried out by transferring one or more files including the operating information (210) where the files are identified in a list of files included in the operating information (212) for the accelerator portion (202) of the service program (530), upon a function call to start the accelerator portion (202) of the service program (530).

The method of FIG. 6 also includes establishing (516), by the system level message passing module (146), direct data communications between the host portion (206) of the service program (530) and the accelerator portion (202) of the service program (530) and, responsive to an instruction (208) communicated directly from the host portion (206) of the service program (530), executing (528) the accelerator application program (204) by the accelerator portion (202) of the service program (530).

Figure 7:
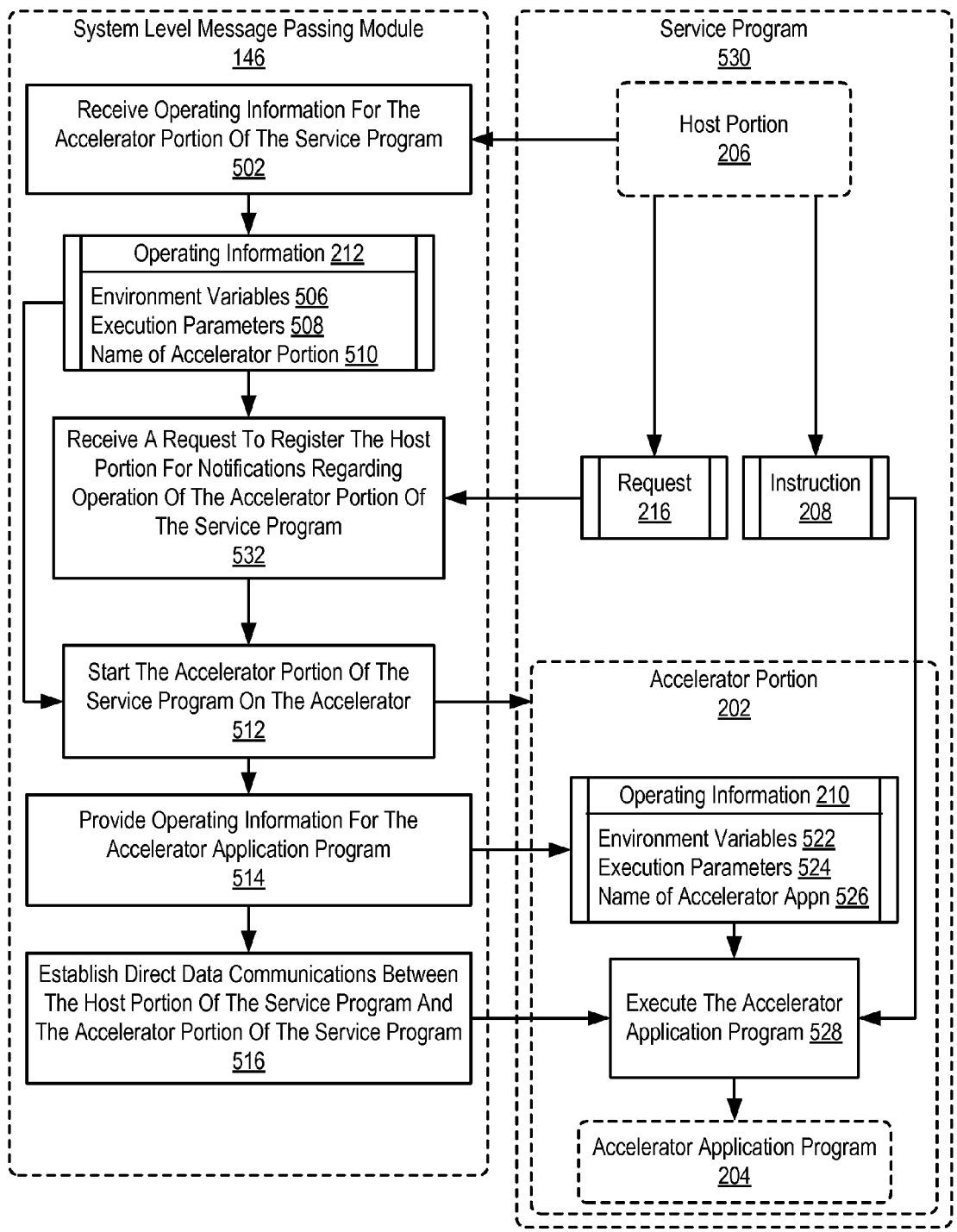
FIG. 7 sets forth a flow chart illustrating a further exemplary method for executing a service program for an accelerator application program in a hybrid computing environment according to embodiments of the present invention.

For further explanation, FIG. 7 sets forth a flow chart illustrating a further exemplary method for executing a service program for an accelerator application program in a hybrid computing environment according to embodiments of the present invention. The method of FIG. 7, like the method of FIG. 6 is carried out in a hybrid computing environment similar to the hybrid computing environments described above in this specification. Such a hybrid computing environment includes a host computer (110 on FIG. 2) having a host computer architecture and an accelerator (104 on FIG. 2) having an accelerator architecture, the accelerator architecture optimized, with respect to the host computer architecture, for speed of execution of a particular class of computing functions, the host computer (110 on FIG. 2) and the accelerator (104 on FIG. 2) adapted to one another for data communications by a system level message passing module (146 on FIG. 2) and, optionally, by two or more data communications fabrics (128, 130 on FIG. 2) of at least two different fabric types. The service program (530) in the example of FIG. 7 includes a host portion (206) configured to execute on the host computer architecture and an accelerator portion (202) configured to execute on the accelerator architecture. The method of FIG. 7 is similar to the method of FIG. 6 including, as it does, the SLMPM's (146) receiving (502), from the host portion (206), operating information (212) for the accelerator portion (202); starting (512) the accelerator portion (206) on the accelerator; providing (514), to the accelerator portion (202), operating information (210) for the accelerator application program (204); establishing (516) direct data communications between the host portion (206) and the accelerator portion (202) and the accelerator portion's (202) executing (528) the accelerator application program (204) responsive to an instruction (208) communicated directly from the host portion (206). The method of FIG. 7 differs from the method of FIG. 6, however, in that the method of FIG. 7 includes receiving (532), by the system level message passing module (146) from the host portion (206) of the service program (530), a request (216) to register the host portion (206) of the service program (530) with the system level message passing module (146) for notifications regarding operation of the accelerator portion (202) of the service program (530). The SLMPM (146) may receive such a request (216) to register the host portion (206) with the SLMPM (146) for notifications regarding operation of the accelerator portion (202) of the service program (530) by receiving the request (216), from the host portion of the service program through an API, as a function call to an SLMPM function with parameters that include an identity of the accelerator portion (202) of the service program (530).

Figure 8:
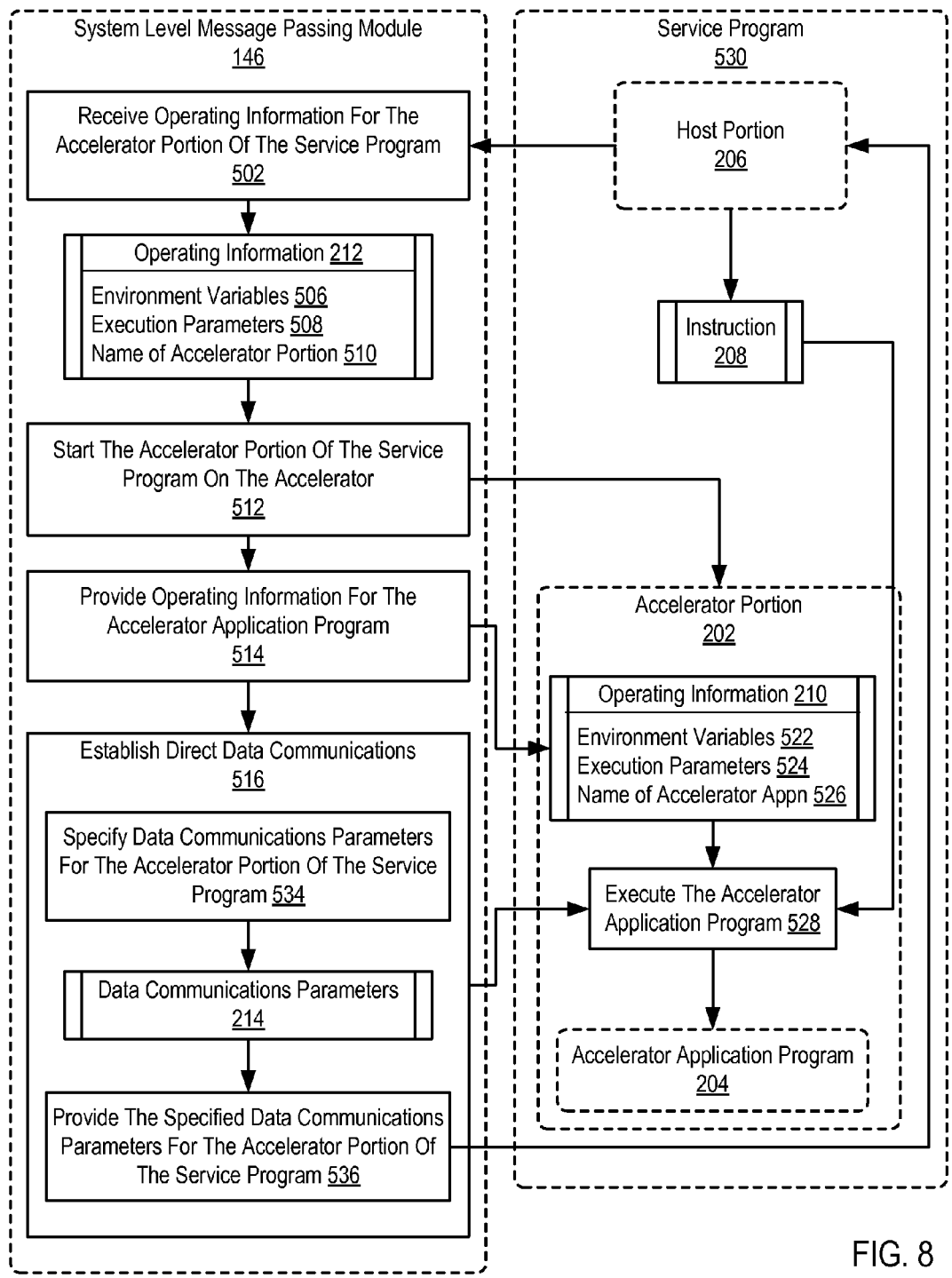
FIG. 8 sets forth a flow chart illustrating a further exemplary method for executing a service program for an accelerator application program in a hybrid computing environment according to embodiments of the present invention.

For further explanation, FIG. 8 sets forth a flow chart illustrating a further exemplary method for executing a service program for an accelerator application program in a hybrid computing environment according to embodiments of the present invention. The method of FIG. 8, like the method of FIG. 6 is carried out in a hybrid computing environment similar to the hybrid computing environments described above in this specification. Such a hybrid computing environment includes a host computer (110 on FIG. 2) having a host computer architecture and an accelerator (104 on FIG. 2) having an accelerator architecture, the accelerator architecture optimized, with respect to the host computer architecture, for speed of execution of a particular class of computing functions, the host computer (110 on FIG. 2) and the accelerator (104 on FIG. 2) adapted to one another for data communications by a system level message passing module (146 on FIG. 2) and, optionally, by two or more data communications fabrics (128, 130 on FIG. 2) of at least two different fabric types. The service program (530) in the example of FIG. 8 includes a host portion (206) configured to execute on the host computer architecture and an accelerator portion (202) configured to execute on the accelerator architecture. The method of FIG. 8 is similar to the method of FIG. 6 including, as it does, the SLMPM's (146) receiving (502), from the host portion (206), operating information (212) for the accelerator portion (202); starting (512) the accelerator portion (206) on the accelerator; providing (514), to the accelerator portion (202), operating information (210) for the accelerator application program (204); establishing (516) direct data communications between the host portion (206) and the accelerator portion (202) and the accelerator portion's (202) executing (528) the accelerator application program (204) responsive to an instruction (208) communicated directly from the host portion (206). The method of FIG. 8 differs from the method of FIG. 6, however, in that in the method of FIG. 8, establishing (516) direct data communications between the host portion (206) and the accelerator portion (202) is carried out by specifying (534), by the system level message passing module (146), data communications parameters (214) for the accelerator portion (202) of the service program (530) and providing (536), by the system level message passing module (146) to the host portion (206) of the service program (530), the specified data communications parameters (214) for the accelerator portion (202) of the service program (530).

Figure 9:
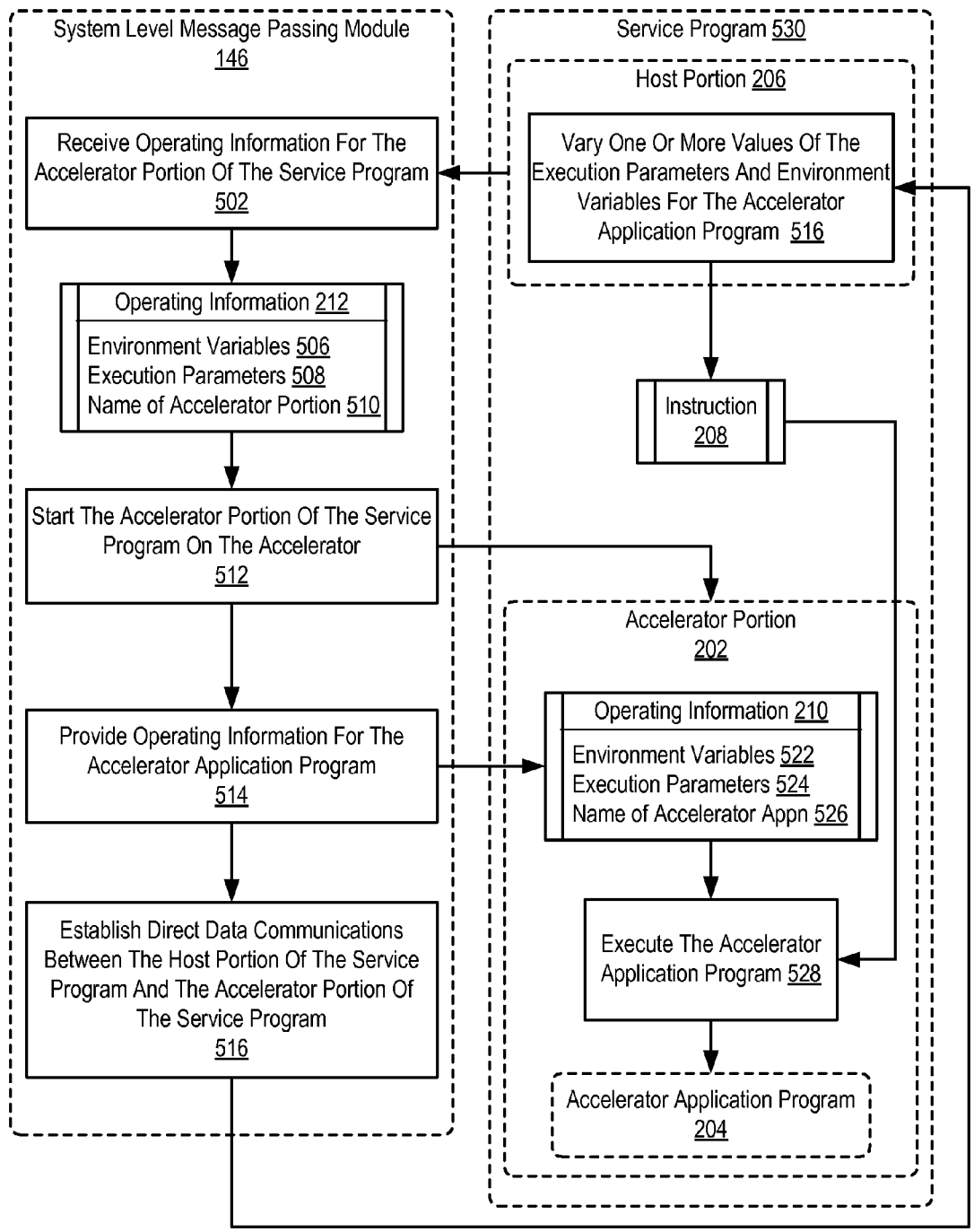
FIG. 9 sets forth a flow chart illustrating a further exemplary method for executing a service program for an accelerator application program in a hybrid computing environment according to embodiments of the present invention.

For further explanation, FIG. 9 sets forth a flow chart illustrating a further exemplary method for executing a service program for an accelerator application program in a hybrid computing environment according to embodiments of the present invention. The method of FIG. 9, like the method of FIG. 6 is carried out in a hybrid computing environment similar to the hybrid computing environments described above in this specification. Such a hybrid computing environment includes a host computer (110 on FIG. 2) having a host computer architecture and an accelerator (104 on FIG. 2) having an accelerator architecture, the accelerator architecture optimized, with respect to the host computer architecture, for speed of execution of a particular class of computing functions, the host computer (110 on FIG. 2) and the accelerator (104 on FIG. 2) adapted to one another for data communications by a system level message passing module (146 on FIG. 2) and, optionally, by two or more data communications fabrics (128, 130 on FIG. 2) of at least two different fabric types. The service program (530) in the example of FIG. 9 includes a host portion (206) configured to execute on the host computer architecture and an accelerator portion (202) configured to execute on the accelerator architecture. The method of FIG. 9 is similar to the method of FIG. 6 including, as it does, the SLMPM's (146) receiving (502), from the host portion (206), operating information (212) for the accelerator portion (202); starting (512) the accelerator portion (206) on the accelerator; providing (514), to the accelerator portion (202), operating information (210) for the accelerator application program (204); establishing (516) direct data communications between the host portion (206) and the accelerator portion (202) and the accelerator portion's (202) executing (528) the accelerator application program (204) responsive to an instruction (208) communicated directly from the host portion (206). The method of FIG. 9 differs from the method of FIG. 6, however, in that the method of FIG. 9 includes varying (516) one or more values of the execution parameters (524) and environment variables (522) for the accelerator application program (204) before executing (528), by the accelerator portion (202) of the service program (530), the accelerator application program (204).

Exemplary embodiments of the present invention are described largely in the context of executing a service program for an accelerator application program in a fully functional hybrid computing environment. Readers of skill in the art will recognize, however, that method aspects of the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of executing a service program for an accelerator application program in a computing system, the computing system comprising a host computer having a host computer architecture, an accelerator having an accelerator architecture, the accelerator architecture optimized, with respect to the host computer architecture, for speed of execution of a particular class of computing functions, the host computer and the accelerator adapted to one another for data communications by a system level message passing module, the service program comprising a module of computer program instructions capable of controlling or monitoring, at the level of individual computer program instructions, execution of the accelerator application program, the service program further comprising a host portion configured to execute on the host computer architecture and an accelerator portion configured to execute on the accelerator architecture, the method comprising:

receiving, by the system level message passing module from the host portion of the service program, operating information for the accelerator portion of the service program;

starting, by the system level message passing module, the accelerator portion of the service program on the accelerator;

providing, by the system level message passing module to the accelerator portion of the service program, operating information for the accelerator application program, the operating information for the accelerator application program comprising system variables and execution parameters;

establishing, by the system level message passing module, direct data communications between the host portion of the service program and the accelerator portion of the service program; and responsive to an instruction communicated directly from the host portion of the service program, executing the accelerator application program by the accelerator portion of the service program.

2. The method of claim 1 further comprising receiving, by the system level message passing module from the host portion of the service program, a request to register the host portion of the service program with the system level message passing module for notifications regarding operation of the accelerator portion of the service program.

3. The method of claim 1 wherein establishing direct data communications between the host portion of the service program and the accelerator portion of the service program further comprises:

specifying, by the system level message passing module, data communications parameters for the accelerator portion of the service program; and providing, by the system level message passing module to the host portion of the service program, the specified data communications parameters for the accelerator portion of the service program.

4. The method of claim 1 further comprising varying one or more values of the execution parameters and system variables for the accelerator application program before executing, by the accelerator portion of the service program, the accelerator application program.

5. The method of claim 1 wherein the host portion of the service program further comprises a client portion and a server portion, the server portion executing on the host computer, the client portion executing on a computer separate from the host computer.

6. The method of claim 1 wherein the host computer and the accelerator adapted to one another for data communications by two or more data communications fabrics of at least two different fabric types.

7. A computing system for executing a service program for an accelerator application program, the computing system comprising a host computer having a host computer architecture, an accelerator having an accelerator architecture, the accelerator architecture optimized, with respect to the host computer architecture, for speed of execution of a particular class of computing functions, the host computer and the accelerator adapted to one another for data communications by a system level message passing module, the service program comprising a module of computer program instructions capable of controlling or monitoring, at the level of individual computer program instructions, execution of the accelerator application program, the service program further comprising a host portion configured to execute on the host computer architecture and an accelerator portion configured to execute on the accelerator architecture, the system level message passing module comprising computer program instructions capable of:

receiving, by the system level message passing module from the host portion of the service program, operating information for the accelerator portion of the service program;

starting, by the system level message passing module, the accelerator portion of the service program on the accelerator;

providing, by the system level message passing module to the accelerator portion of the service program, operating information for the accelerator application program, the operating information for the accelerator application program comprising system variables and execution parameters;

establishing, by the system level message passing module, direct data communications between the host portion of the service program and the accelerator portion of the service program; and the accelerator portion of the service program comprising computer program instructions capable of executing, by the accelerator portion of the service program, responsive to an instruction communicated directly from the host portion of the service program, the accelerator application program with the execution parameters and system variables.

8. The computing system of claim 7 further comprising computer program instructions capable of receiving, by the system level message passing module from the host portion of the service program, a request to register the host portion of the service program with the system level message passing module for notifications regarding operation of the accelerator portion of the service program.

9. The computing system of claim 7 wherein establishing direct data communications between the host portion of the service program and the accelerator portion of the service program further comprises:

specifying, by the system level message passing module, data communications parameters for the accelerator portion of the service program; and providing, by the system level message passing module to the host portion of the service program, the specified data communications parameters for the accelerator portion of the service program.

10. The computing system of claim 7 further comprising computer program instructions capable of varying one or more values of the execution parameters and system variables for the accelerator application program before executing the accelerator program by the accelerator portion of the service program.

11. The computing system of claim 7 wherein the host portion of the service program further comprises a client portion and a server portion, the server portion executing on the host computer, the client portion executing on a computer separate from the host computer.

12. The computing system of claim 7 wherein the host computer and the accelerator adapted to one another for data communications by two or more data communications fabrics of at least two different fabric types.

13. A computer program product for executing a service program for an accelerator application program in a computing system, the computing system comprising a host computer having a host computer architecture; an accelerator having an accelerator architecture, the accelerator architecture optimized, with respect to the host computer architecture, for speed of execution of a particular class of computing functions, the host computer and the accelerator adapted to one another for data communications by a system level message passing module, the service program comprising a module of computer program instructions capable of controlling or monitoring, at the level of individual computer program instructions, execution of the accelerator application program, the service program further comprising a host portion configured to execute on the host computer architecture and an accelerator portion configured to execute on the accelerator architecture, the computer program product disposed upon a recordable computer readable storage medium, the computer program product including computer program instructions capable of:

receiving, by the system level message passing module from the host portion of the service program, operating information for the accelerator portion of the service program;

starting, by the system level message passing module, the accelerator portion of the service program on the accelerator;

providing, by the system level message passing module to the accelerator portion of the service program, operating information for the accelerator application program, the operating information for the accelerator application program comprising system variables and execution parameters;

establishing, by the system level message passing module, direct data communications between the host portion of the service program and the accelerator portion of the service program; and executing, by the accelerator portion of the service program, responsive to an instruction communicated directly from the host portion of the service program, the accelerator application program with the execution parameters and system variables.

14. The computer program product of claim 13 further comprising computer program instructions capable of receiving, by the system level message passing module from the host portion of the service program, a request to register the host portion of the service program with the system level message passing module for notifications regarding operation of the accelerator portion of the service program.

15. The computer program product of claim 13 wherein establishing direct data communications between the host portion of the service program and the accelerator portion of the service program further comprises:

specifying, by the system level message passing module, data communications parameters for the accelerator portion of the service program; and providing, by the system level message passing module to the host portion of the service program, the specified data communications parameters for the accelerator portion of the service program.

16. The computer program product of claim 13 further comprising computer program instructions capable of varying one or more values of the execution parameters and system variables for the accelerator application program before executing the accelerator program by the accelerator portion of the service program.

17. The computer program product of claim 13 wherein the host portion of the service program further comprises a client portion and a server portion, the server portion executing on the host computer, the client portion executing on a computer separate from the host computer.

18. The computer program product of claim 13 wherein the host computer and the accelerator adapted to one another for data communications by two or more data communications fabrics of at least two different fabric types.

* * * * *